US012177129B2

(12) United States Patent
Mondet et al.

(10) Patent No.: US 12,177,129 B2
(45) Date of Patent: Dec. 24, 2024

(54) APPLICATION DATA UNIT ARCHITECTURE AND SIGNALING

(71) Applicant: QUALCOMM Incorporated, San Diego, CA (US)

(72) Inventors: Mickael Mondet, Louannec (FR); Yih-Hao Lin, San Diego, CA (US); Prashanth Haridas Hande, San Diego, CA (US); Ravi Agarwal, San Diego, CA (US); Peerapol Tinnakornsrisuphap, San Diego, CA (US); Miguel Griot, La Jolla, CA (US); Dario Serafino Tonesi, San Diego, CA (US); Sitaramanjaneyulu Kanamarlapudi, San Diego, CA (US); Ozcan Ozturk, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 17/657,031

(22) Filed: Mar. 29, 2022

(65) Prior Publication Data

US 2023/0318982 A1    Oct. 5, 2023

(51) Int. Cl.
*H04L 47/2475* (2022.01)
*H04L 69/22* (2022.01)
(Continued)

(52) U.S. Cl.
CPC ..... *H04L 47/2475* (2013.01); *H04W 28/0268* (2013.01); *H04W 72/535* (2023.01); *H04L 69/22* (2013.01)

(58) Field of Classification Search
CPC ................. H04L 47/2475; H04L 69/22; H04L 45/306; H04L 47/24; H04L 47/2441; H04L 47/34;
(Continued)

(56) References Cited

U.S. PATENT DOCUMENTS

| 9,591,685 B2 | 3/2017 | Krishnamoorthy et al. |
| 2010/0215008 A1 | 8/2010 | Wang et al. |

(Continued)

FOREIGN PATENT DOCUMENTS

| CN | 104994087 A | 10/2015 |
| EP | 1040630 A1 | 10/2000 |

(Continued)

OTHER PUBLICATIONS

Provisional U.S. Appl. No. 63/294,713, filed 2021.*

(Continued)

*Primary Examiner* — Rushil P. Sampat
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a network node, an indication of one or more data radio bearers between the UE and the network node that are configured for application data unit (ADU) traffic. The UE may communicate, with an application server, one or more ADU traffic flows through the network node using the one or more data radio bearers. Numerous other aspects are provided.

30 Claims, 22 Drawing Sheets

(51) Int. Cl.
*H04W 28/02* (2009.01)
*H04W 72/50* (2023.01)

(58) Field of Classification Search
CPC .......... H04W 72/535; H04W 28/0268; H04W 76/10
See application file for complete search history.

(56) References Cited

U.S. PATENT DOCUMENTS

| | | | |
|---|---|---|---|
| 2012/0082314 A1 | 4/2012 | Fukuda | |
| 2013/0336486 A1 | 12/2013 | Agiwal | |
| 2015/0365879 A1 | 12/2015 | Marque-Pucheu et al. | |
| 2015/0372717 A1 | 12/2015 | Schrum | |
| 2016/0036700 A1 | 2/2016 | Unnimadhavan et al. | |
| 2016/0182451 A1 | 6/2016 | Nandagopal et al. | |
| 2020/0186896 A1 | 6/2020 | Westerlund et al. | |
| 2023/0164081 A1* | 5/2023 | Rossbach | H04W 28/0263 370/235 |
| 2023/0247476 A1* | 8/2023 | Chun | H04L 65/1073 370/235 |
| 2024/0073302 A1* | 2/2024 | Chun | H04L 47/2441 |

FOREIGN PATENT DOCUMENTS

| | | |
|---|---|---|
| EP | 3086596 A1 | 10/2016 |
| EP | 3326327 A1 | 5/2018 |
| WO | WO-2017014834 A1 | 1/2017 |
| WO | WO-2017133277 A1 | 8/2017 |

OTHER PUBLICATIONS

Provisional U.S. Appl. No. 63/305,767, filed 2022.*
International Search Report and Written Opinion—PCT/US2023/061391—ISA/EPO—Jun. 15, 2023.
Partial International Search Report—PCT/US2023/061391—ISA/EPO—Apr. 25, 2023.
Qualcomm Incorporated (Rapporteur)1: "FS_XRTraffic: Permanent Document, V0.8.0", 3GPP TSG-SA4 Meeting #115e, S4-211210, Aug. 18-27, 2021, 3GPP TSG SA WG4#117e, S4-220047, Feb. 14-23, 2022, 3rd Generation Partnership Project, Mobile Competence Centre, 650, Route Des Lucioles, F-06921 Sophia-Antipolis Cedex, France, vol. SA WG4, No. e-meeting, 131 Pages, XP052196096, Paragraph [6.2.6], [07.5], [8.3.2], [09.1] and [9.4.2].

* cited by examiner

APPLICATION DATA UNIT ARCHITECTURE AND SIGNALING

FIELD OF THE DISCLOSURE

Aspects of the present disclosure generally relate to wireless communication and to techniques and apparatuses for an application data unit architecture and signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, an indication of one or more data radio bearers between the UE and the network node that are configured for application data unit (ADU) traffic. The method may include communicating, with an application server, one or more ADU traffic flows through the network node using the one or more data radio bearers.

Some aspects described herein relate to a method of wireless communication performed by a UE. The method may include receiving one or more Internet protocol (IP) packets associated with an ADU traffic flow. The method may include receiving ADU metadata associated with the one or more IP packets.

Some aspects described herein relate to a method of wireless communication performed by a network node. The method may include transmitting, to a UE, one or more IP packets associated with an ADU traffic flow. The method may include transmitting, to the UE, ADU metadata associated with the one or more IP packets.

Some aspects described herein relate to a method of wireless communication performed by a first network node. The method may include receiving, from a UE, one or more IP packets associated with an ADU traffic flow, and ciphered ADU metadata associated with the one or more IP packets. The method may include transmitting the one or more IP packets and the ciphered ADU metadata to a second network node. The method may include receiving, from the second network node, deciphered ADU metadata associated with the one or more IP packets.

Some aspects described herein relate to a method of wireless communication performed by a first network node. The method may include receiving, from a second network node, one or more IP packets associated with an ADU traffic flow, and ciphered ADU metadata associated with the one or more IP packets. The method may include deciphering the ciphered ADU metadata to obtain deciphered ADU metadata associated with the one or more IP packets. The method may include transmitting, to the second network node, the deciphered ADU metadata.

Some aspects described herein relate to a UE for wireless communication. The user equipment may include a memory and one or more processors coupled to the memory. The one or more processors may be configured to receive, from a network node, an indication of one or more data radio bearers between the UE and the network node that are configured for ADU traffic. The one or more processors may be configured to communicate, with an application server, one or more ADU traffic flows through the network node using the one or more data radio bearers.

Some aspects described herein relate to a UE for wireless communication. The user equipment may include a memory and one or more processors coupled to the memory. The one or more processors may be configured to receive one or more IP packets associated with an ADU traffic flow. The one or more processors may be configured to receive ADU metadata associated with the one or more IP packets.

Some aspects described herein relate to a network node for wireless communication. The network node may include a memory and one or more processors coupled to the memory. The one or more processors may be configured to transmit, to a UE, one or more IP packets associated with an ADU traffic flow. The one or more processors may be configured to transmit, to the UE, ADU metadata associated with the one or more IP packets.

Some aspects described herein relate to a first network node for wireless communication. The first network node may include a memory and one or more processors coupled to the memory. The one or more processors may be configured to receive, from a UE. The one or more processors may be configured to transmit the one or more IP packets and the ciphered ADU metadata to a second network node. The one or more processors may be configured to receive, from the second network node, deciphered ADU metadata associated with the one or more IP packets.

Some aspects described herein relate to a first network node for wireless communication. The first network node may include a memory and one or more processors coupled to the memory. The one or more processors may be configured to receive, from a second network node. The one or more processors may be configured to decipher the ciphered ADU metadata to obtain deciphered ADU metadata associated with the one or more IP packets. The one or more processors may be configured to transmit, to the second network node, the deciphered ADU metadata.

Some aspects described herein relate to a non-transitory computer-readable medium that stores a set of instructions for wireless communication by a UE. The set of instructions, when executed by one or more processors of the UE, may cause the UE to receive, from a network node, an indication of one or more data radio bearers between the UE and the network node that are configured for ADU traffic. The set of instructions, when executed by one or more processors of the UE, may cause the UE to communicate, with an application server, one or more ADU traffic flows through the network node using the one or more data radio bearers.

Some aspects described herein relate to a non-transitory computer-readable medium that stores a set of instructions for wireless communication by a UE. The set of instructions, when executed by one or more processors of the UE, may cause the UE to receive one or more IP packets associated with an ADU traffic flow. The set of instructions, when executed by one or more processors of the UE, may cause the UE to receive ADU metadata associated with the one or more IP packets.

Some aspects described herein relate to a non-transitory computer-readable medium that stores a set of instructions for wireless communication by a network node. The set of instructions, when executed by one or more processors of the network node, may cause the network node to transmit, to a UE, one or more Internet protocol (IP) packets associated with an ADU traffic flow. The set of instructions, when executed by one or more processors of the network node, may cause the network node to transmit, to the UE, ADU metadata associated with the one or more IP packets.

Some aspects described herein relate to a non-transitory computer-readable medium that stores a set of instructions for wireless communication by a first network node. The set of instructions, when executed by one or more processors of the first network node, may cause the first network node to receive, from a UE. The set of instructions, when executed by one or more processors of the first network node, may cause the first network node to transmit the one or more IP packets and the ciphered ADU metadata to a second network node. The set of instructions, when executed by one or more processors of the first network node, may cause the first network node to receive, from the second network node, deciphered ADU metadata associated with the one or more IP packets.

Some aspects described herein relate to a non-transitory computer-readable medium that stores a set of instructions for wireless communication by a first network node. The set of instructions, when executed by one or more processors of the first network node, may cause the first network node to receive, from a second network node. The set of instructions, when executed by one or more processors of the first network node, may cause the first network node to decipher the ciphered ADU metadata to obtain deciphered ADU metadata associated with the one or more IP packets. The set of instructions, when executed by one or more processors of the first network node, may cause the first network node to transmit, to the second network node, the deciphered ADU metadata.

Some aspects described herein relate to an apparatus for wireless communication. The apparatus may include means for receiving, from a network node, an indication of one or more data radio bearers between the apparatus and the network node that are configured for ADU traffic. The apparatus may include means for communicating, with an application server, one or more ADU traffic flows through the network node using the one or more data radio bearers.

Some aspects described herein relate to an apparatus for wireless communication. The apparatus may include means for receiving one or more IP packets associated with an ADU traffic flow. The apparatus may include means for receiving ADU metadata associated with the one or more IP packets.

Some aspects described herein relate to an apparatus for wireless communication. The apparatus may include means for transmitting, to a UE, one or more IP packets associated with an ADU traffic flow. The apparatus may include means for transmitting, to the UE, ADU metadata associated with the one or more IP packets.

Some aspects described herein relate to an apparatus for wireless communication. The apparatus may include means for receiving, from a UE, one or more IP packets associated with an ADU traffic flow, and ciphered ADU metadata associated with the one or more IP packets. The apparatus may include means for transmitting the one or more IP packets and the ciphered ADU metadata to a network node. The apparatus may include means for receiving, from the network node, deciphered ADU metadata associated with the one or more IP packets.

Some aspects described herein relate to an apparatus for wireless communication. The apparatus may include means for receiving, from a network node, one or more IP packets associated with an ADU traffic flow, and ciphered ADU metadata associated with the one or more IP packets. The apparatus may include means for deciphering the ciphered ADU metadata to obtain deciphered ADU metadata associated with the one or more IP packets. The apparatus may include means for transmitting, to the network node, the deciphered ADU metadata.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
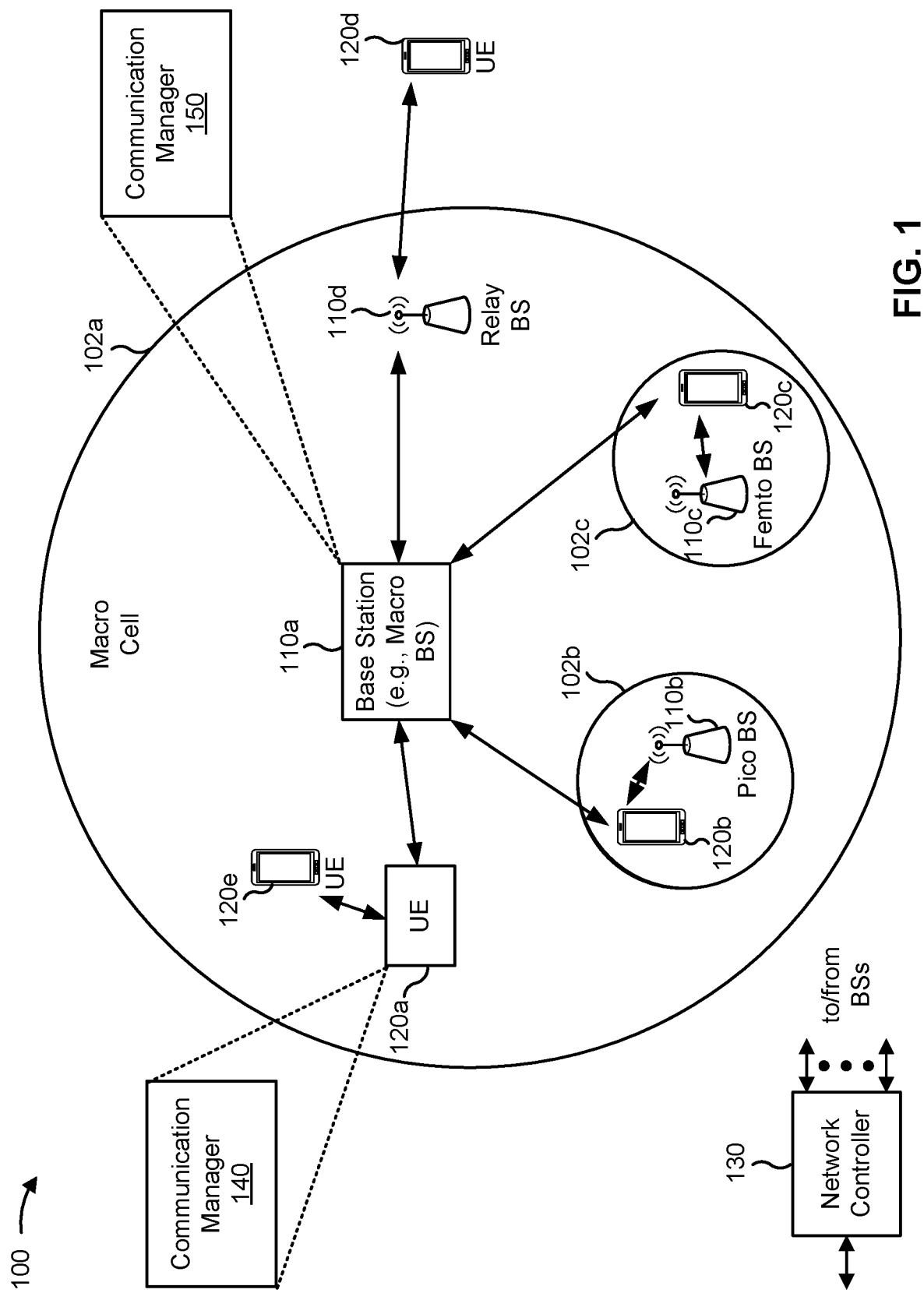
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network nodes. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the term "base station" (e.g., the base station 110) or "network node" or "network entity" may refer to an aggregated base station, a disaggregated base station (e.g., described in connection with FIG. 3), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some aspects, a UE 120 may include a communication manager 140. As described in more detail elsewhere herein, the communication manager 140 may receive, from a network node, an indication of one or more data radio bearers between the UE and the network node that are configured for application data unit (ADU) traffic; and communicate, with an application server, one or more ADU traffic flows through the network node using the one or more data radio bearers. Additionally, or alternatively, the communication manager 140 may perform one or more other operations described herein.

In some aspects, a UE 120 may include a communication manager 140. As described in more detail elsewhere herein, the communication manager 140 may receive one or more Internet protocol (IP) packets associated with an ADU traffic flow; and receive ADU metadata associated with the one or more IP packets. Additionally, or alternatively, the communication manager 140 may perform one or more other operations described herein.

In some aspects, a base station 110 may include a communication manager 150. As described in more detail elsewhere herein, the communication manager 150 may transmit, to a UE, one or more IP packets associated with an ADU traffic flow; and transmit, to the UE, ADU metadata associated with the one or more IP packets. Additionally, or alternatively, the communication manager 150 may perform one or more other operations described herein.

In some aspects, a base station 110 may include a communication manager 150. As described in more detail elsewhere herein, the communication manager 150 may receive, from a UE, one or more IP packets associated with an ADU traffic flow and ciphered ADU metadata associated with the one or more IP packets; transmit the one or more IP packets and the ciphered ADU metadata to a network node; and receive, from the network node, deciphered ADU metadata associated with the one or more IP packets. Additionally, or alternatively, the communication manager 150 may perform one or more other operations described herein.

In some aspects, a base station 110 may include a communication manager 150. As described in more detail elsewhere herein, the communication manager 150 may receive, from a network node: one or more IP packets associated with an ADU traffic flow, and ciphered ADU metadata associated with the one or more IP packets; decipher the ciphered ADU metadata to obtain deciphered ADU metadata associated with the one or more IP packets; and transmit, to the network node, the deciphered ADU metadata. Additionally, or alternatively, the communication manager 150 may perform one or more other operations described herein.

As indicated above, FIG. 1 is provided as an example. Other examples may differ from what is described with regard to FIG. 1.

Figure 2:
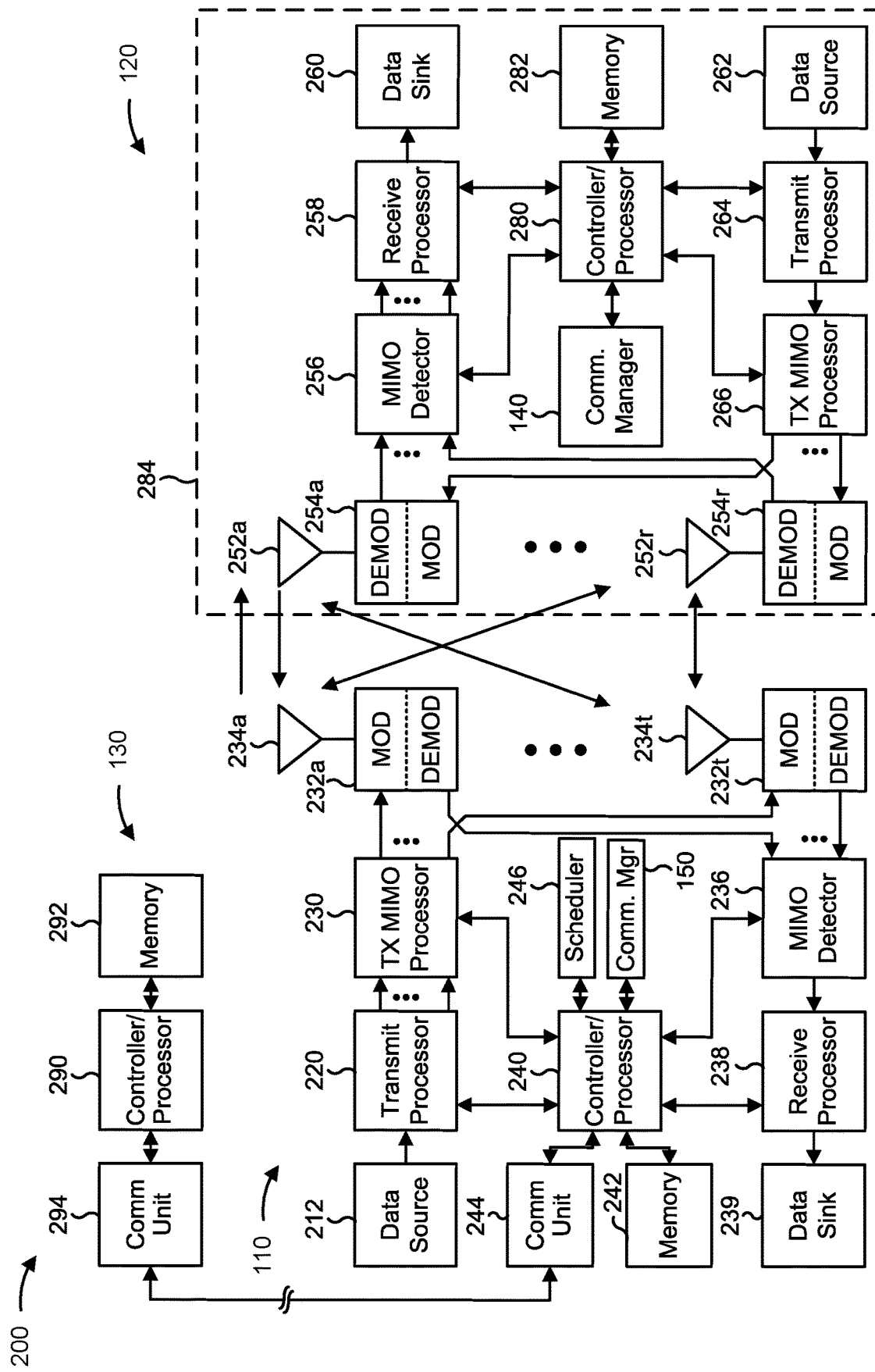
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-16).

The controller/processor 240 of the base station 110, the controller/processor 280 of the UE 120, and/or any other component(s) of FIG. 2 may perform one or more techniques associated with ADU signaling, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code)

for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE 120 includes means for receiving, from a network node, an indication of one or more data radio bearers between the UE 120 and the network node that are configured for ADU traffic; and/or means for communicating, with an application server, one or more ADU traffic flows through the network node using the one or more data radio bearers. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving one or more IP packets associated with an ADU traffic flow; and/or means for receiving ADU metadata associated with the one or more IP packets. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, one or more IP packets associated with an ADU traffic flow; and/or means for transmitting, to the UE, ADU metadata associated with the one or more IP packets. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station 110 includes means for receiving, from a UE, one or more IP packets associated with an ADU traffic flow and ciphered ADU metadata associated with the one or more IP packets; means for transmitting the one or more IP packets and the ciphered ADU metadata to a network node; and/or means for receiving, from the network node, deciphered ADU metadata associated with the one or more IP packets. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station 110 includes means for receiving, from a network node, one or more IP packets associated with an ADU traffic flow, and ciphered ADU metadata associated with the one or more IP packets; means for deciphering the ciphered ADU metadata to obtain deciphered ADU metadata associated with the one or more IP packets; and/or means for transmitting, to the network node, the deciphered ADU metadata. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
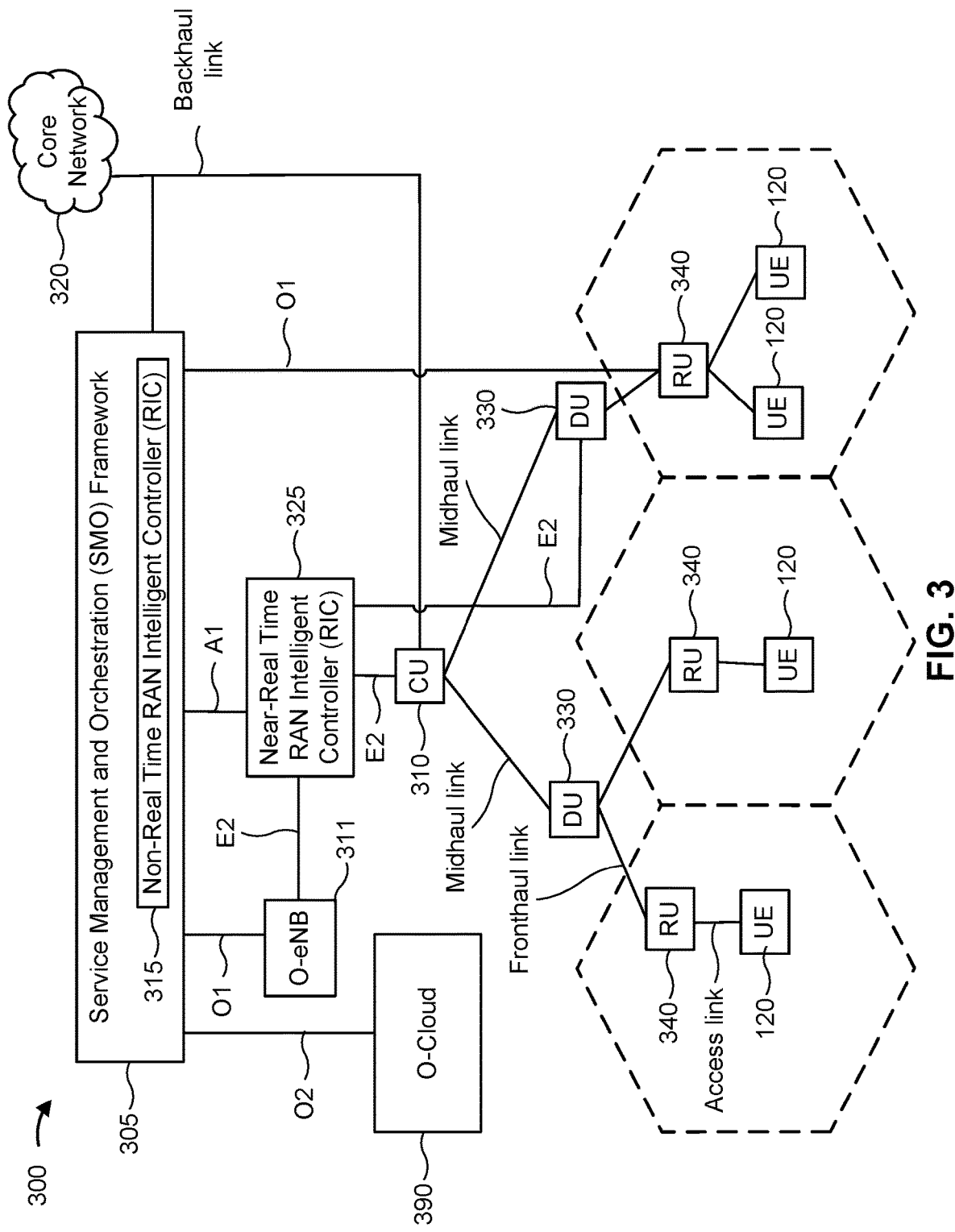
FIG. 3 is a diagram of an example of an open radio access network (O-RAN) architecture, in accordance with the present disclosure.

FIG. 3 is a diagram illustrating an example of a disaggregated base station architecture 300, in accordance with the present disclosure. The disaggregated base station architecture 300 may be included in and/or implemented in the wireless network 100. The disaggregated base station architecture 300 may include a plurality of network nodes, such as one or more CUs 310 that can communicate directly with a core network via a backhaul link, or indirectly with the core network through one or more disaggregated base station units (such as a Near-RT RIC 325 via an E2 link, or a Non-RT RIC 315 associated with a Service Management and Orchestration (SMO) Framework 305, or both). A CU 310 may communicate with one or more network nodes such as DUs 330 via respective midhaul links, such as an F1 interface. The DUs 330 may communicate with one or more network nodes, such as RUs 340 via respective fronthaul links. The RUs 340 may communicate with respective UEs 120 via one or more radio frequency (RF) access links. In some aspects, the UE 120 may be simultaneously served by multiple RUs 340. In some aspects, a UE 120 may include an extended reality (XR) device and/or may be associated with an XR device.

Each of the units (i.e., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter, or a transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The core network may include a plurality of network controllers 130 and/or one or more other types of network nodes.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
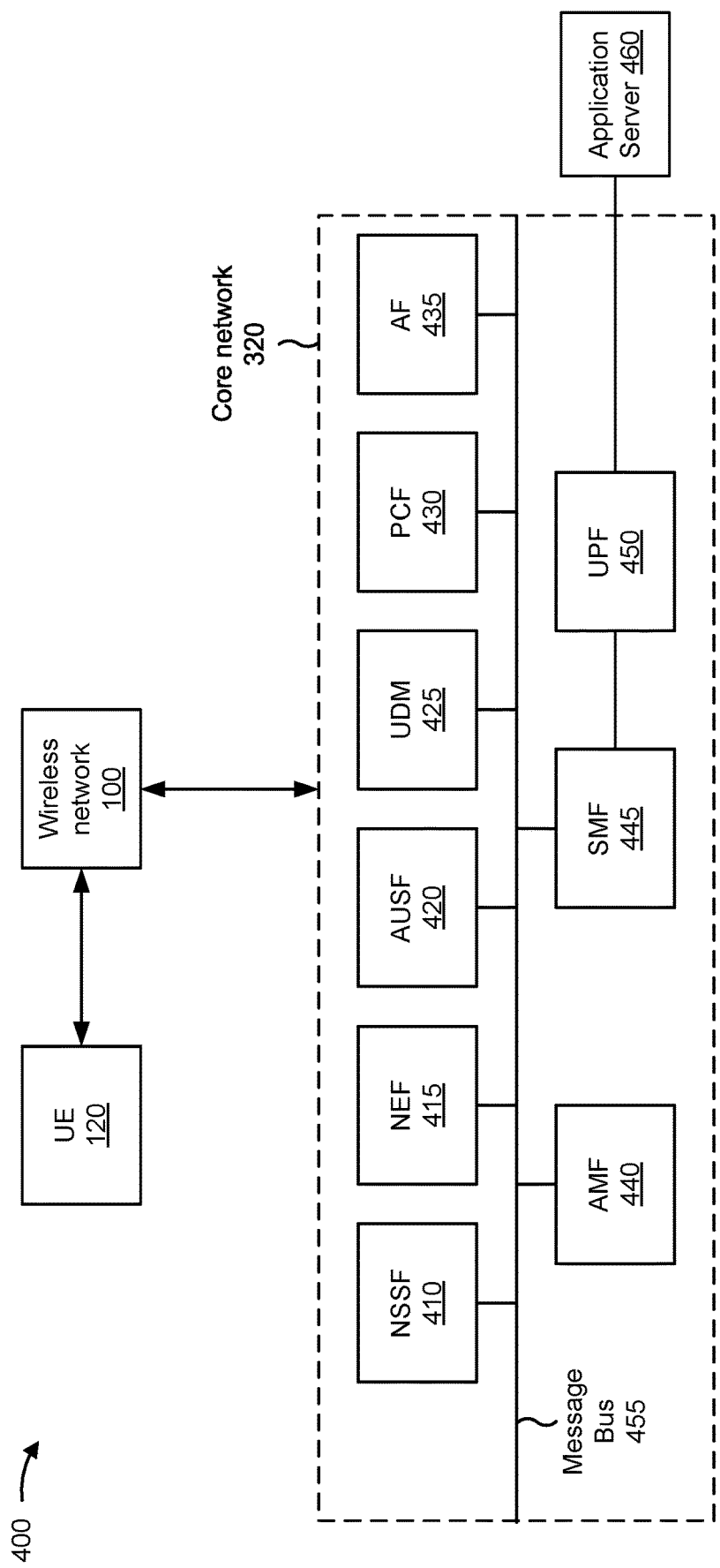
FIG. 4 is a diagram of an example of a core network configured to provide network slicing, in accordance with the present disclosure.

FIG. 4 is a diagram of an example 400 of a core network 320 configured to provide network slicing, in accordance with the present disclosure. The core network 320 may be communicatively coupled to the wireless network 100. In some aspects, the disaggregated base station architecture 300 is implemented in the wireless network 100. Devices and/or networks of example 400 may interconnect via wired connections, wireless connections, or a combination thereof.

The UE 120 may include one or more devices capable of receiving, generating, storing, processing, and/or providing information, such as information described herein. For example, the UE 120 may include a mobile phone (e.g., a smart phone or a radiotelephone, among other examples), a laptop computer, a tablet computer, a desktop computer, a handheld computer, a gaming device, a wearable communication device (e.g., a smart watch or a pair of smart glasses, among other examples), a mobile hotspot device, a fixed wireless access device, customer premises equipment, an autonomous vehicle, or a similar type of device.

The wireless network 100 may support, for example, a cellular RAT. The wireless network 100 may include one or more base stations (e.g., base transceiver stations, radio base stations, node Bs, eNodeBs (eNBs), gNodeBs (gNBs), base station subsystems, cellular sites, cellular towers, access points, TRPs, radio access nodes, macrocell base stations, microcell base stations, picocell base stations, femtocell base stations, or similar types of devices) and other network nodes that can support wireless communication for the UE 120. The wireless network 100 may transfer traffic between the UE 120 (e.g., using a cellular RAT), one or more base stations (e.g., using a wireless interface or a backhaul interface, such as a wired backhaul interface), and/or the core network 320. The wireless network 100 may provide one or more cells that cover geographic areas.

In some aspects, the wireless network 100 may perform scheduling and/or resource management for the UE 120 covered by the wireless network 100 (e.g., the UE 120 covered by a cell provided by the wireless network 100). In some aspects, the wireless network 100 may be controlled or coordinated by a network controller (e.g., network controller 130 of FIG. 1), which may perform load balancing and/or network-level configuration, among other examples. As described above in connection with FIG. 1, the network controller may communicate with the wireless network 100 via a wireless or wireline backhaul. In some aspects, the wireless network 100 may include a network controller, a self-organizing network (SON) module or component, or a similar module or component. Accordingly, the wireless network 100 may perform network control, scheduling, and/or network management functions (e.g., for uplink, downlink, and/or sidelink communications of the UE 120 covered by the wireless network 100).

In some aspects, the core network 320 may include an example functional architecture in which systems and/or methods described herein may be implemented. For example, the core network 320 may include an example architecture of a fifth generation (5G) next generation (NG) core network included in a 5G wireless telecommunications system. Although the example architecture of the core network 320 shown in FIG. 4 may be an example of a service-based architecture, in some aspects, the core network 320 may be implemented as a reference-point architecture and/or a 4G core network, among other examples.

As shown in FIG. 4, the core network 320 may include a number of functional elements. The functional elements may be implemented as one or more network controllers 130. The functional elements may include, for example, a network slice selection function (NSSF) 410, a network exposure function (NEF) 415, an authentication server function (AUSF) 420, a unified data management (UDM) component 425, a policy control function (PCF) 430, an application function (AF) 435, an access and mobility management function (AMF) 440, a session management function (SMF) 445, and/or a user plane function (UPF) 450, among other examples. These functional elements may be communicatively connected via a message bus 455. Each of the functional elements shown in FIG. 4 may be implemented on one or more devices associated with a wireless telecommunications system. In some implementations, one or more of the functional elements may be implemented on physical devices, such as an access point, a base station, and/or a gateway, among other examples. In some implementations, one or more of the functional elements may be implemented on a computing device of a cloud computing environment.

The NSSF 410 may include one or more devices that select network slice instances for the UE 120. Network slicing is a network architecture model in which logically distinct network slices operate using common network infrastructure. For example, several network slices may operate as isolated end-to-end networks customized to satisfy different target service standards for different types of applications executed, at least in part, by the UE 120 and/or communications to and from the UE 120. Network slicing may efficiently provide communications for different types of services with different service standards.

The NSSF 410 may determine a set of network slice policies to be applied at the wireless network 100. For example, the NSSF 410 may apply one or more UE route selection policy (URSP) rules. In some aspects, the NSSF 410 may select a network slice based on a mapping of a data network name (DNN) field included in a route selection description (RSD) to the DNN field included in a traffic descriptor selected by the UE 120. By providing network slicing, the NSSF 410 allows an operator to deploy multiple substantially independent end-to-end networks potentially with the same infrastructure. In some implementations, each slice may be customized for different services.

The NEF 415 may include one or more devices that support exposure of capabilities and/or events in the wireless telecommunications system to help other entities in the wireless telecommunications system discover network services. The AUSF 420 may include one or more devices that act as an authentication server and support the process of authenticating the UE 120 in the wireless telecommunications system.

The UDM 425 may include one or more devices that store user data and profiles in the wireless telecommunications system. In some aspects, the UDM 425 may be used for fixed access and/or mobile access, among other examples, in the core network 320.

The PCF 430 may include one or more devices that provide a policy framework that incorporates network slicing, roaming, packet processing, and/or mobility management, among other examples. In some aspects, the PCF 430 may include one or more URSP rules used by the NSSF 410 to select network slice instances for the UE 120.

The AF 435 may include one or more devices that support application influence on traffic routing, access to the NEF 415, and/or policy control, among other examples. The AMF 440 may include one or more devices that act as a termination point for non-access stratum (NAS) signaling and/or mobility management, among other examples. In some aspects, the AMF may request the NSSF 410 to select network slice instances for the UE 120, e.g., at least partially in response to a request for data service from the UE 120.

The SMF 445 may include one or more devices that support the establishment, modification, and release of communication sessions in the wireless telecommunications system. For example, the SMF 445 may configure traffic steering policies at the UPF 450 and/or enforce user equipment IP address allocation and policies, among other examples. In some aspects, the SMF 445 may provision the network slice instances selected by the NSSF 410 for the UE 120.

The UPF 450 may include one or more devices that serve as an anchor point for intraRAT and/or interRAT mobility. In some aspects, the UPF 450 may apply rules to packets, such as rules pertaining to packet routing, traffic reporting, and/or handling user plane QoS, among other examples. The UPF 450 may communicate with a network node in the wireless network 100 on a backhaul interface such as an N3 interface. For example, the UPF 450 may communicate with a CU 310 in the wireless network 100.

The message bus 455 may be a logical and/or physical communication structure for communication among the functional elements. Accordingly, the message bus 455 may permit communication between two or more functional elements, whether logically (e.g., using one or more application programming interfaces (APIs), among other examples) and/or physically (e.g., using one or more wired and/or wireless connections).

The core network 320 may provide access to and/or facilitate communication with an application server 460. The UE 120 may communicate with the application server 460 through the wireless network 100 and the core network 320. The communication path between the UE 120 and the application server 460 may include a base station 110 (or one or more components of a base station 110 or another type of network node, such as a CU 310, a DU 330, and/or an RU 340, among other examples), a UPF 450, and/or another network controller 130. The UE 120 and the application server 460 may communicate to exchange application data (e.g., data associated with an application client executed by the UE 120 and/or an application host executed by the application server 460), application signaling, application control information, and/or another type of information associated with an application.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example 400 may perform one or more functions described as being performed by another set of devices of example environment 400.

Figure 5:
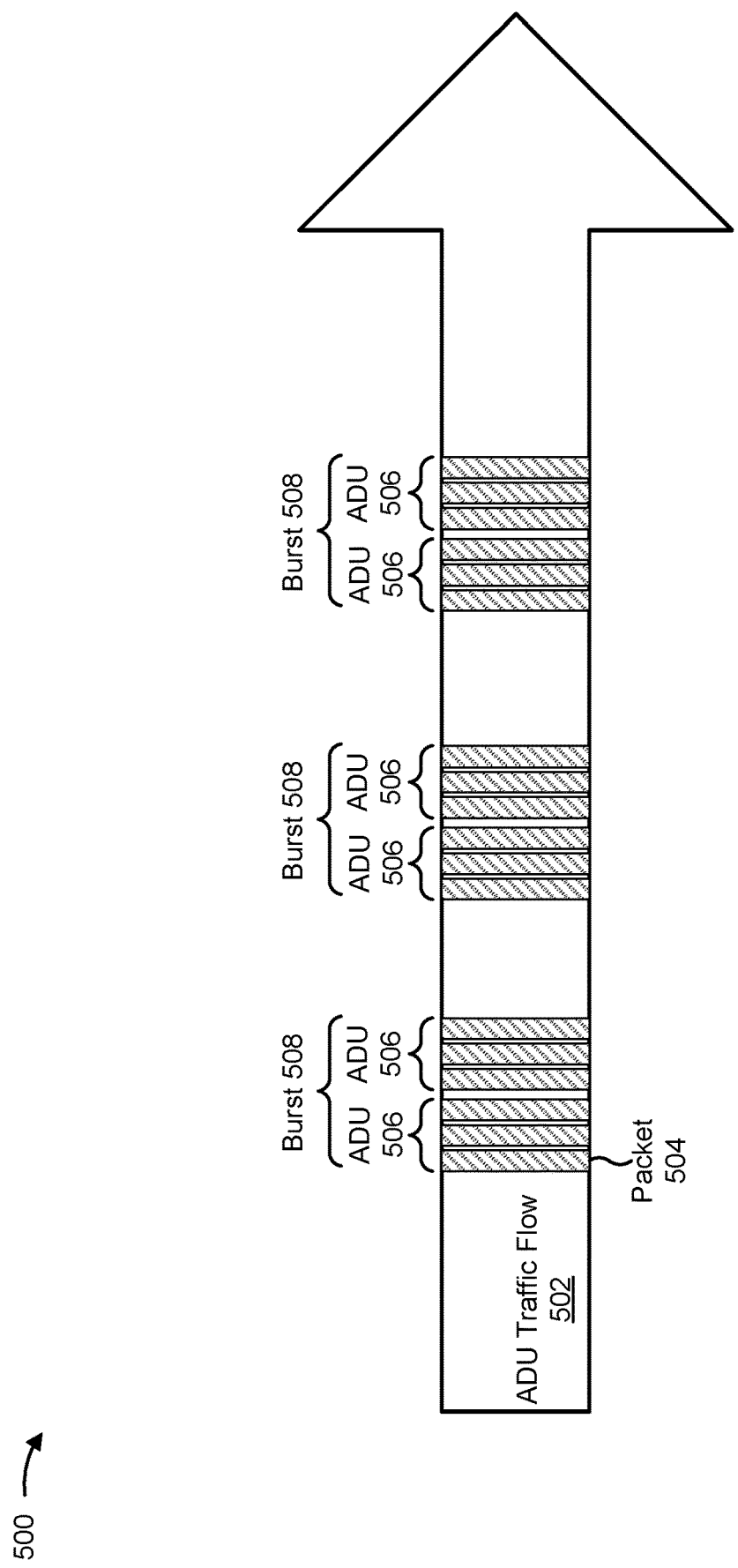
FIG. 5 is a diagram of an example of application data unit (ADU) traffic flow, in accordance with the present disclosure.

FIG. 5 is a diagram of an example 500 of an ADU traffic flow, in accordance with the present disclosure. An ADU traffic flow may include a flow of packets between a UE 120 and an application server 460, the packets may be associated with an application. A UE 120 may execute an application (or "app") such as a messaging application, a gaming application, an augmented reality (AR) application, a video application, and/or another type of application. The UE 120 and the application server 460 may exchange information associated with the application in one or more ADU traffic flows 502.

As shown in FIG. 5, an ADU traffic flow 502 associated with the application may be transmitted in packets 504. A packet 504 may include an IP packet or another type of electronic packet. An ADU 506 refers to a set of packets that are jointly processed in connection with the application. A burst 508 includes a set of ADUs 506 that is generated by an application at approximately the same time. An ADU traffic flow 502 may include a service flow in which bursts 508 of ADUs 506 are transmitted and/or received.

Applications may consume data in ADUs 506 rather than individual packets 504. For example, one video frame (or one slice of a video frame) for a video application may be transmitted per burst 508 of ADUs 506. "ADU aware" devices may refer to devices (e.g., a UE 120, a base station 110, a CU 310, a DU 330, an RU 340, a UPF 450, an application server 460) that are capable of ADU-based application signaling. In some aspects, an ADU includes a group of PDUs that represent a frame, a slice, a burst or other logical breakdown of an application layer data segment. In some cases, an ADU may also be referred to as a PDU set. A PDU Set may be composed of one or more PDUs carrying the payload of one unit of information generated at the application level (e.g. a frame or video slice for XRM services), which are of same importance requirement at application layer. All PDUs in a PDU set may be needed by the application layer to use the corresponding unit of information. In some cases, the application layer can still recover parts of the information unit when some PDUs are missing.

Performance parameters (e.g., key process indicators (KPIs) and/or another type of performance parameters) associated with an application may be tracked and/or monitored on an ADU basis rather than an IP packet basis. For example, a UE 120 and/or an application server 460 may track and/or monitor an ADU error rate (AER), an ADU delay budget (ADB), an ADU discard time (ADT), and/or an ADU content policy (ACP), among other examples. An AER performance parameter may refer to a quantity of ADUs 506 received in error on average. An ADB performance parameter may refer to a maximum delay tolerable by an ADU 506. An ADT performance parameter may refer to a maximum queue retention for an ADU 506, which may be greater than the maximum delay tolerable by the ADU 506. An ACP performance parameter may refer to a minimum percentage of ADU bits that are required to be delivered when an ADU 506 is FEC protected.

Tracking and/or monitoring of one or more of the ADU performance parameters described above may enable ADU attributes to be accounted for in scheduling metrics at a network node (e.g., a base station 110, a CU 310, a DU 330, and/or an RU 340, among other examples). Tracking and/or monitoring of one or more of the ADU performance parameters described above may enable the network node to stop scheduling bits of an ADU 506 if previous bits have failed. Tracking and/or monitoring of one or more of the ADU performance parameters described above may enable a network node to provide more robust transmission of remaining bits of an ADU 506 when close to a delivery deadline for the ADU 506. Tracking and/or monitoring of one or more of the ADU performance parameters described above may enable a UE 120 to perform ACP calculations, may enable ADU packet loss detection at the UE 120, may enable early notification by the UE 120 that a sufficient quantity of packets 504 of an ADU 506 have been received, and/or may enable updates of logical channel priorities at the UE 120 based on the urgence of remaining packets 504 of an ADU 506, among other examples.

As indicated above, FIG. 5 is provided as an example. Other examples may differ from what is described with regard to FIG. 5.

Figure 6:
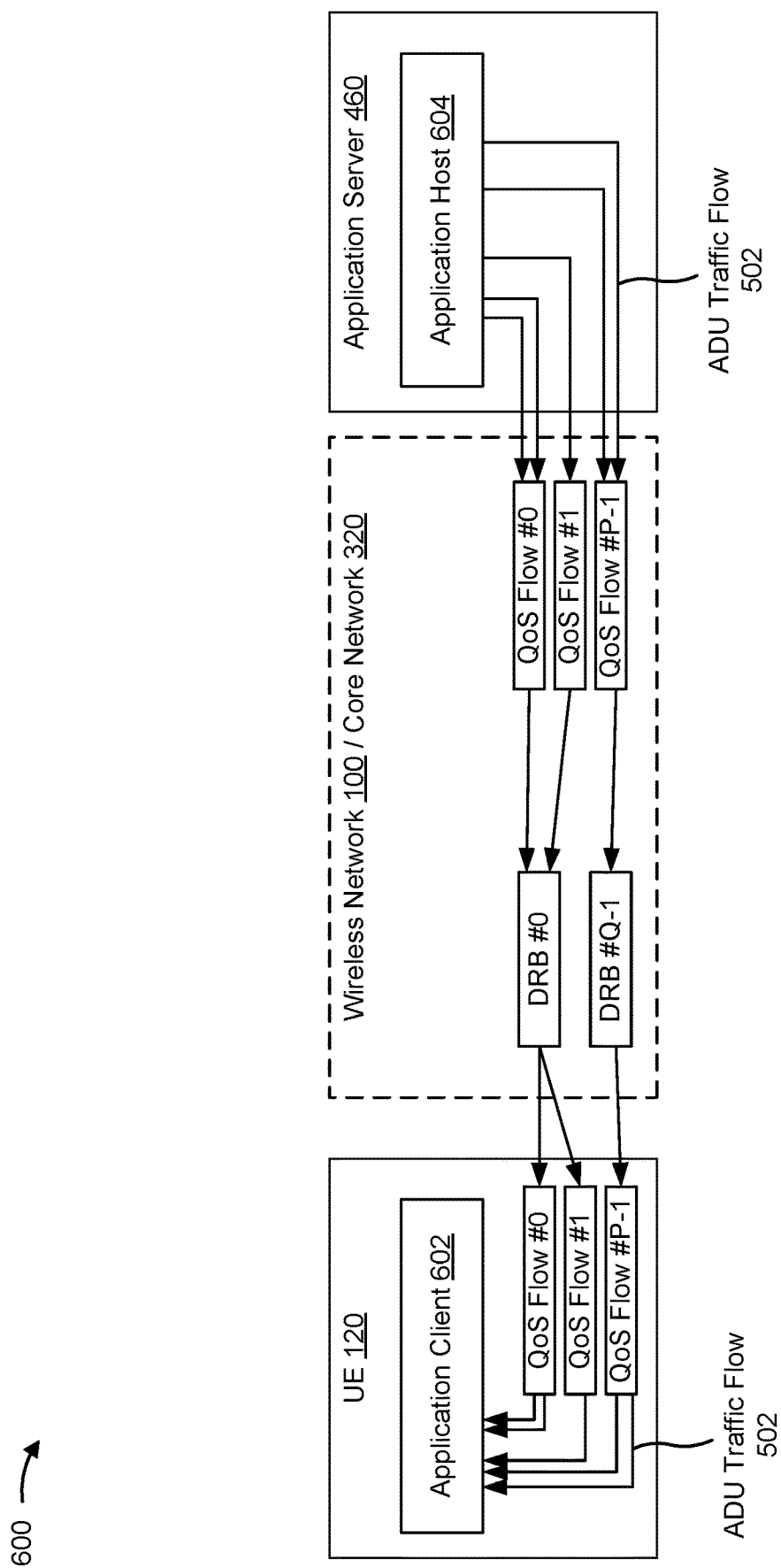
FIG. 6 is a diagram of an example ADU traffic flow mapping for ADU traffic associated with an application, in accordance with the present disclosure.

FIG. 6 is a diagram of an example ADU traffic flow mapping 600 for traffic associated with an application, in accordance with the present disclosure. As described above, a UE 120 and an application server 460 may exchange information associated with an application in one or more ADU traffic flows 502. Each ADU traffic flow 502 may include one or more bursts 508 of one or more ADUs 506 that each include one or more packets 504.

As shown in FIG. 6, the UE 120 may execute an application client 602 associated with the application. The application server 460 may execute an application host 604 associated with the application. UE 120 may transmit one or more ADU traffic flows 502 associated with the application to the application server 460 and/or may receive one or more ADU traffic flows 502 associated with the application from the application server 460. Similarly, the application server 460 may transmit one or more ADU traffic flows 502 associated with the application to the UE 120 and/or may receive one or more ADU traffic flows 502 associated with the application from the UE 120.

As further shown in FIG. 6, one or more network nodes in the wireless network 100 and/or in the core network 320 may map an ADU traffic flow 502 onto a quality of service (QoS) flow. In some aspects, an ADU traffic flow 502 can be mapped to one QoS flow only. However, a plurality of ADU traffic flows 502 can be mapped onto the same QoS flow. The one or more network nodes in the wireless network 100 and/or in the core network 320 may utilize QoS flows 0 through P−1 for the UE 120 and/or for the application.

The one or more network nodes in the wireless network 100 and/or in the core network 320 may map a QoS flow onto a data radio bearer (DRB) of a network node such as a base station 110, a CU 310, a DU 330, and/or an RU 340, among other examples. In some aspects, a QoS flow can be mapped to one DRB. However, a plurality of QoS flows can be mapped onto the same DRB. The one or more network nodes in the wireless network 100 and/or in the core network 320 may utilize DRBs 0 through Q−1 for the UE 120 and/or for the application.

Other types of traffic flows can be mapped onto a QoS flow and/or onto a DRB with an ADU traffic flow 502. For example, a protocol data unit (PDU) traffic flow (e.g., a PDU-based traffic flow in which packets are mapped onto a PDU as opposed to an ADU) and an ADU traffic flow 502 may be mapped onto the same QoS flow and/or onto the same DRB. A DRB that is configured to carry at least one ADU traffic flow 502 may be referred to as an "ADU aware" DRB.

As indicated above, FIG. 6 is provided as an example. Other examples may differ from what is described with regard to FIG. 6.

As indicated above, an ADU traffic flow may be mapped onto a DRB in a wireless network along with one or more other types of traffic flows such as a PDU traffic flow. In some cases, a UE may be unable to determine which DRBs of a network node are ADU aware. As a result, the UE may be unable to determine which DRBs are configured to carry ADU traffic flows, which may result in the UE being unable to track and/or monitor ADU performance parameters for the ADU aware DRBs (e.g., the ADU performance parameters described above). This may result in reduced performance and/or reliability for ADU traffic flows associated with the UE, which may result in increased latency for an application that is executed by the UE, may result in increased lag in a gaming application that is executed by the UE, may result in stuttering and/or dropped video frames for a video application that is executed by the UE, and/or may result in reduced performance and/or user experience for another type of application that is executed by the UE.

Some aspects described herein provide ADU signaling to facilitate tracking and/or monitoring of ADU traffic flows associated with an application that is executed by a UE (e.g., a UE 120). In some aspects, a network node (e.g., a base station 110, a CU 310, a DU 330, and/or an RU 340, among other examples) may provide the UE with ADU signaling that indicates the ADU aware DRBs that are configured to carry the ADU traffic flows associated with the application. The ADU signaling may further include ADU metadata associated with the ADU traffic flows of the UE. The ADU metadata may facilitate tracking and/or monitoring of ADU performance parameters for the ADU aware DRBs. This may enable the UE to increase the performance and/or reliability for the ADU traffic flows associated with the UE, which may reduce latency for an application that is executed by the UE, may reduce lag in a gaming application that is executed by the UE, may reduce stuttering and/or reduce the quantity of dropped video frames for a video application that is executed by the UE, and/or may increase performance and/or user experience for another type of application that is executed by the UE.

Figure 7A:
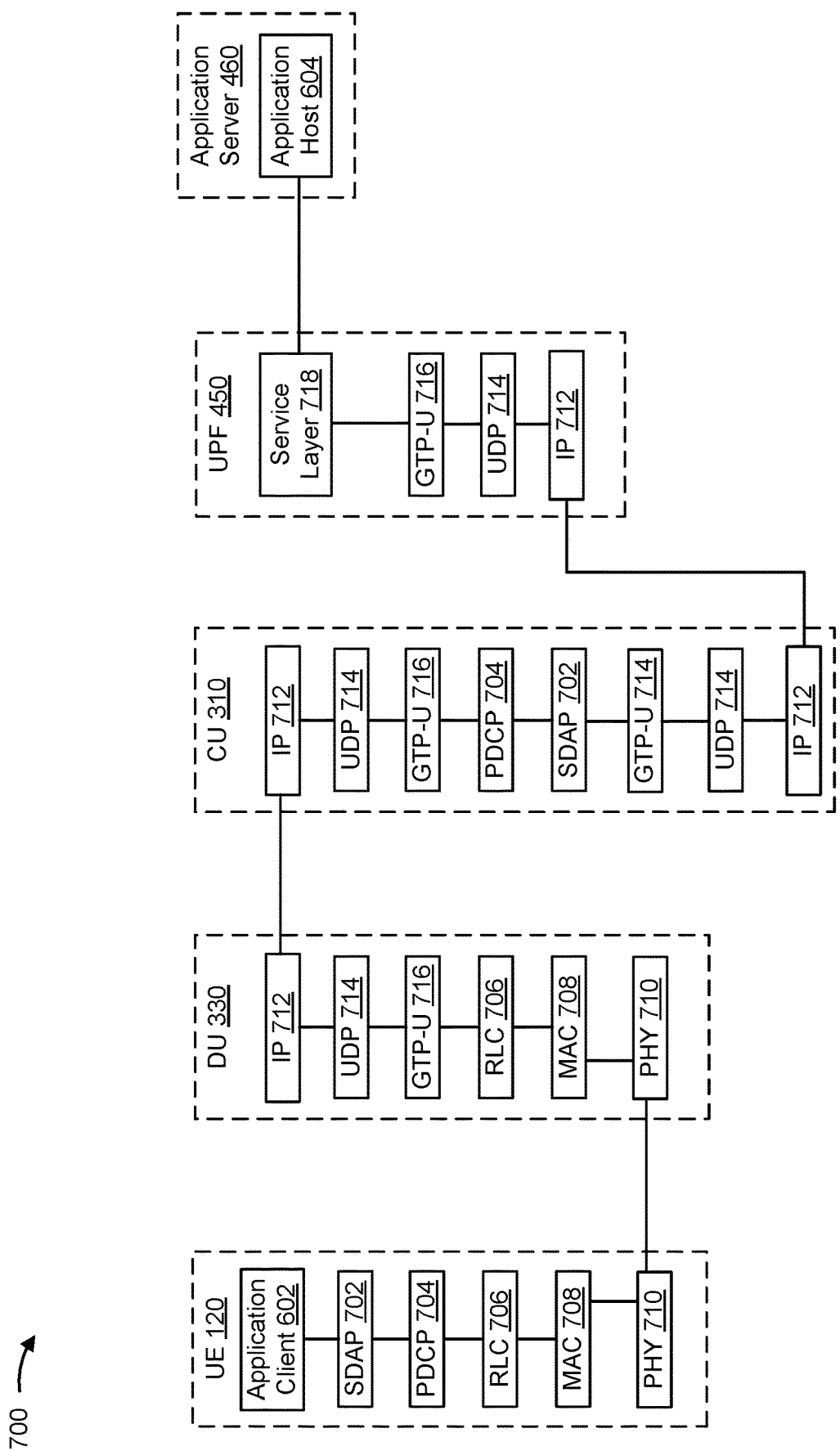
FIGS. 7A-7C are diagrams of examples of an ADU metadata signaling architecture, in accordance with the present disclosure.
Figure 7B:
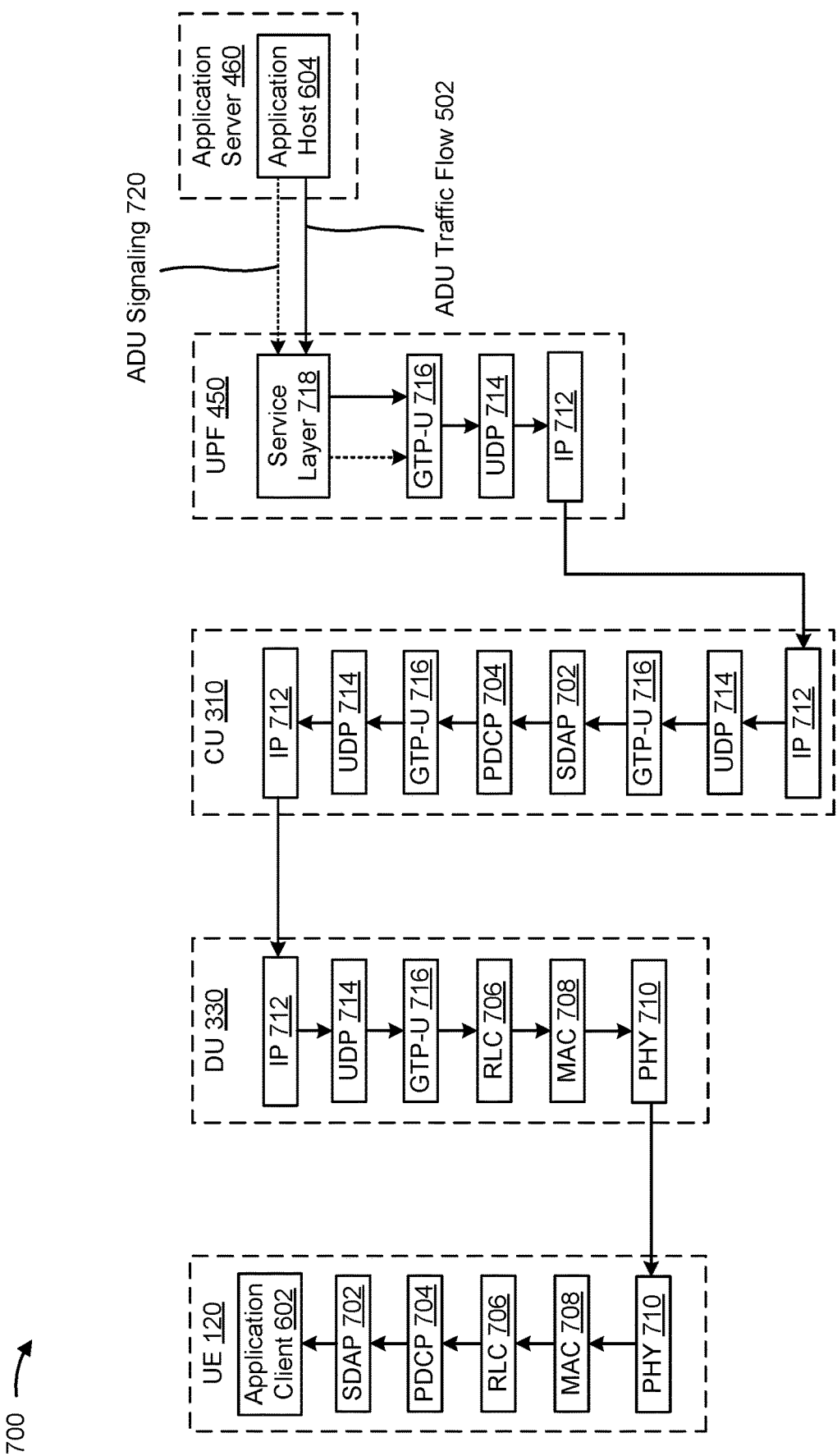
Figure 7C:
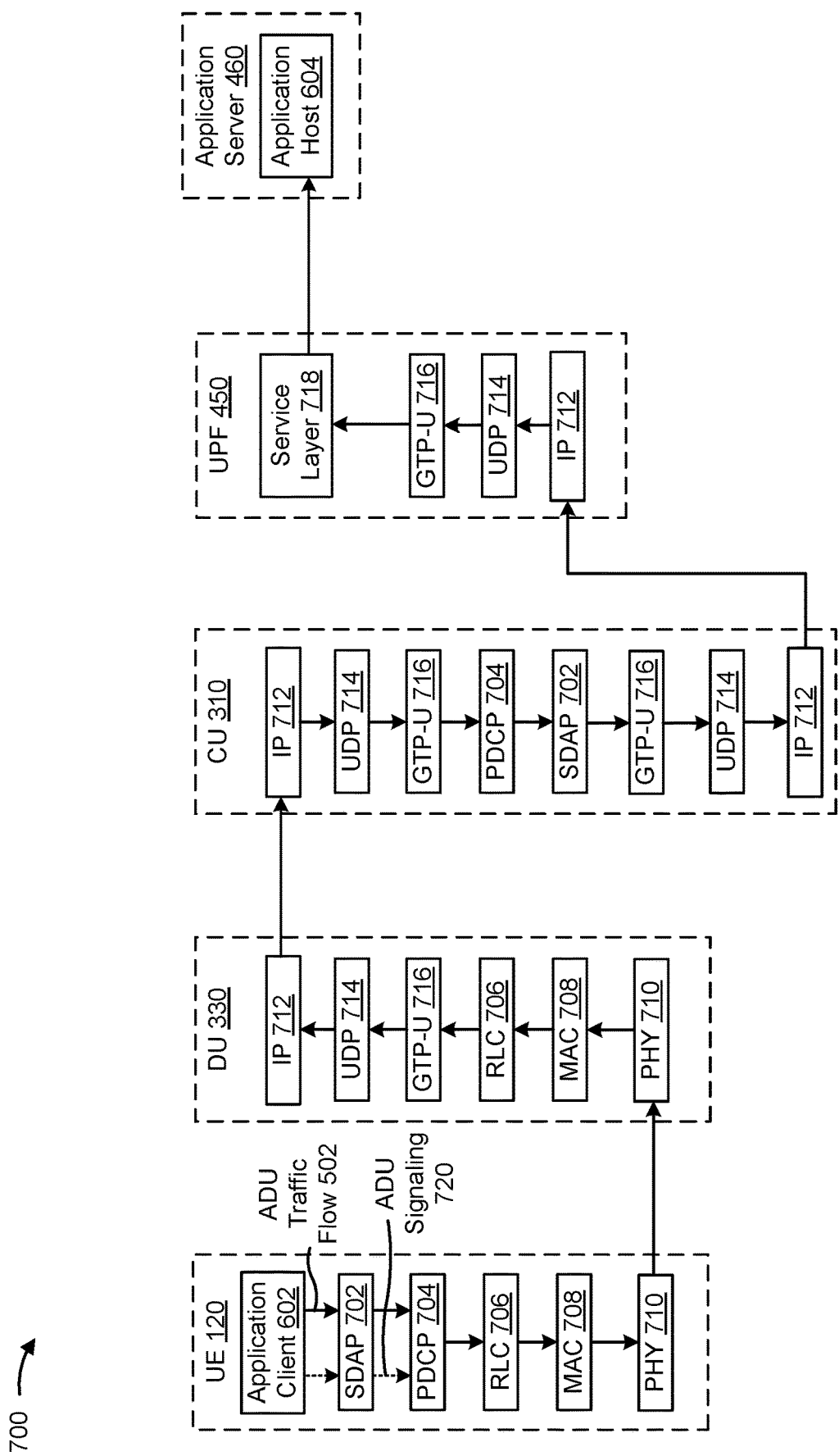

FIGS. 7A-7C are diagrams illustrating examples of an ADU signaling architecture 700, in accordance with the present disclosure. The ADU signaling architecture 700 enables a UE 120 to be provided with ADU metadata associated with one or more ADU traffic flows 502 associated with the UE 120. The ADU metadata enables the UE 120 to identify the DRBs that are used to carry the ADU traffic flows 502 and enables the UE 120 to track and/or monitor ADU performance parameters associated with the one or more ADU traffic flows 502.

As shown in FIG. 7A, the ADU signaling architecture 700 may include communication between one or more network nodes and/or wireless communication devices, such as a UE 120, a DU 330 and a CU 310 of a base station 110 and/or another type of network node, a UPF 450, and an application server 460, among other examples. In some aspects, one or more other core network components included in the core network 320 may be included in the ADU signaling architecture 700.

As further shown in FIG. 7A, each of the UE 120, the DU 330, the CU 310, and the UPF 450 may include a communication protocol stack that is configured to support ADU signaling and ADU traffic flows associated with an application. The UE 120 may include an SDAP layer (SDAP 702), a PDCP layer (PDCP 704), an RLC layer (RLC 706), a MAC layer (MAC 708), and a physical layer (PHY 710), among other examples. The DU 330 may include an IP layer (IP 712), a user datagram protocol (UDP) layer (UDP 714), a general packet radio service (GPRS) tunneling protocol (GTP) user layer (GTP-U 716), an RLC 706, a MAC 708, and a PHY 710, among other examples. The UE 120 and the DU 330 may communicate using the physical layer (e.g., the PHY 710), which may include wireless communication on an access link (a Uu interface) in the wireless network 100.

The CU 310 may include an IP 712, a UDP 714, a GTP-U 716, a PDCP 704, and an SDAP 702 to support communication with the DU 330. The CU 310 and the DU 330 may communicate at the IP 712, which may include communication on a midhaul link in the disaggregated base station architecture 300 using an F1 interface or another type of midhaul interface. The CU 310 may also include another GTP-U 716, another UDP 714, and another IP 712 to support communication with the UPF 450. The UPF 450 may include an IP 712, a UDP 714, a GTP-U 716, and a service layer 718. The CU 310 and the UPF 450 may communicate at the IP 712, which may include communication on a backhaul link to the core network 320 using an N3 interface or another type of backhaul interface. The UPF 450 may communicate with the application host 604 of the application server 460 at the service layer 718.

FIG. 7B illustrates an example of downlink communication in the ADU signaling architecture 700, which includes the transmission of an ADU traffic flow 502 from the application host 604 on the application server 460 to the application client 602 on the UE 120. As shown in FIG. 7B, The ADU traffic flow 502 is provided by the application host 604 to the service layer 718 of the UPF 450. The ADU traffic flow 502 is provided from the service layer 718 to the GTP-U 716, from the GTP-U 716 to the UDP 714, from the UDP 714 to the IP 712, and rom the IP 712 of the UPF 450 to the IP 712 of the CU 310 on the N3 interface. The ADU traffic flow 502 is provided from the IP 712 of the CU 310 to the UDP 714, from the UDP 714 to the GTP-U 716, from the GTP-U 716 to the SDAP 702, from the SDAP 702 to the PDCP 704, from the PDCP 704 to the GTP-U 716, from the GTP-U 716 to the UDP 714, from the UDP 714 to the IP 712, and from the IP 712 of the CU 310 to the IP 712 of the DU 330 on the F1 interface. The ADU traffic flow 502 is provided from the IP 712 of the DU 330 to the UDP 714, from the UDP 714 to the GTP-U 716, from the GTP-U 716 to the RLC 706, from the RLC 706 to the MAC 708, from the MAC 708 to the PHY 710, and from the PHY 710 of the DU 330 to the PHY 710 of the UE 120 on the Uu interface. The ADU traffic flow 502 is provided from the PHY 710 of the UE 120 to the MAC 708, from the MAC 708 to the RLC 706, from the RLC 706 to the PDCP 704, from the PDCP 704 to the SDAP 702, and from the SDAP 702 to the application client 602 of the UE 120.

As further shown in FIG. 7B, the application server 460 may provide ADU signaling 720 from the application host 604 to the service layer 718 of the UPF 450. The ADU signaling 720 may include ADU metadata associated with the ADU traffic flow 502, which may include information related to the ADUs 506 of the ADU traffic flow 502 and/or information related to the packets 504 of the ADUs 506. The service layer 718 of the UPF 450 may convert the ADU signaling 720 into more 5GS specific ADU metadata format information to be utilized in the wireless network 100 and/or in the core network 320. The ADU metadata of the ADU signaling 720 may be extended into the headers of the GTP-U 716, which may include next generation user plane (NG-U) headers. The ADU metadata of the ADU signaling 720 may be provided on the F1 interface from the CU 310 to the DU 330 using F1 user plane (F1-U) headers by extending the GTP-U headers of the GTP-U 716.

As described herein, the DU 330 may provide the ADU metadata of the ADU signaling 720 to the UE 120 (e.g., to the application client 602 of the UE 120) using one or more techniques, such as prepending or appending the ADU metadata to a PDCP header or to an SDAP header, among other examples. The DU 330 (or another network node such as a base station 110) may also provide the UE 120 with an indication of the ADU aware DRB that are used to carry the ADU traffic flow 502. The DU 330 may provide the ADU metadata and/or the indication of the one or more ADU aware DRBs in an RRC communication and/or another type of downlink communication.

In some aspects, the ADU metadata includes an indication that one or more packets 504 are associated with an ADU 506 of the ADU traffic flow 502. For example, the ADU metadata may include an ADU based service flow flag that is used to indicate whether the one or more packets 504 belong to an ADU based service flow (e.g., the ADU traffic flow 502). In some aspects, the flag may be set to a first value (e.g., a 0 value or another value) to indicate that the one or more packets 504 belong to a PDU based service flow (e.g., a traffic flow other than the ADU traffic flow 502), or may be set to a second value (e.g., a 1 value or another value) to indicate that the one or more packets 504 belong to an ADU based service flow (e.g., the ADU traffic flow 502). If the ADU based service flow flag is set to the first value, the other elements of the metadata may be present but meaningless, whereas the other elements of the metadata may be present and meaningful to the UE 120 if the ADU based service flow flag is set to the second value.

In some aspects, the ADU metadata includes an indication of a QoS flow associated with the one or more packets 504. For example, the ADU metadata may include a QoS flow identifier (QFI). In some cases, if there is an inter-dependent across ADUs 506 of the ADU traffic flow 502, a service flow identifier may be required.

In some aspects, the ADU metadata includes an indication of the ADU 506 in which the one or more packets 504 are included. The indication may include an ADU sequence number. In some cases, if PDCP ordered delivery is enabled and RLC acknowledged mode (RLC-AM) is configured, an ADU sequence number may be indicated for the middle and last ADU 506 may be sufficient.

In some aspects, the ADU metadata includes an indication of a burst sequence number for each of the one or more packets 504. The burst sequence number may identify the burst 508 to which the ADU 506 in which the one or more packets 504 are transmitted. The burst sequence number may enable the use of fewer bits for encoding the ADU sequence number described above. In some aspects, if the burst sequence number is not included in the ADU metadata, ADU sequence numbers is used to identify the ADUs 506 across several bursts 508 in a frame of the ADU traffic flow 502. In some aspects, if the burst sequence number is included in the ADU metadata, the ADU sequence number may indicate the ADUs 506 included in the associated burst 508.

In some aspects, the ADU metadata includes an indication of a size of the ADUs 506 included in the ADU traffic flow 502. In some aspects, the DU 330 may use RRC signaling to configure the quantity of bits that are required for carrying the size of the ADUs 506 that is indicated in the ADU metadata. The configuration can be based on a list of options (e.g. {4, 8, 12, 16 . . . } bits).

In some aspects, the ADU metadata includes an indication of a quantity of packets 504 included in each ADU 506 of the ADU traffic flow 502. In some aspects, the DU 330 may use RRC signaling to configure the quantity of bits in the ADU metadata that are required for carrying the quantity of packets 504 included in each ADU 506 that is indicated in the ADU metadata. The configuration can be based on a list of options (e.g. {4, 8, 12, 16 . . . } bits).

In some aspects, the ADU metadata includes an indication of an ACP for the ADU traffic flow 502. In some aspects, the indication of the size of the ADUs 506, the indication of the quantity of packets 504, and/or the indication of the ACP may not be included with the first few packets 504 of an ADU 506, as some encoders may start sending the first packets before the full encoding of the ADU 506 is complete. In these cases, an indication or value may be reserved to signal that this information is or is not available.

In some aspects, the ADU metadata includes an indication of an ADT for the ADUs 506 of the ADU traffic flow 502. The ADT may include a maximum amount of time that an ADU 506 can be waiting for transmission at the DU 330 or another network node before being discarded. The time between a frame and a reference frame for the ADU 506 can be dynamic. In some aspects, an information element for the ADT may not be present. If not, an ADT corresponding to QoS parameters for the ADU traffic flow 502 may be used. In these cases, an indication or value may be reserved to signal that this information is or is not available.

In some aspects, the ADU metadata includes an indication of an IP packet number for each of the one or more packets 504 of an ADU 506 in the ADU traffic flow 502. The IP packet number may include an IP sequence number or another number that identifies a packet 504 in an ADU 506. In the downlink, IP packets may be received at the DU 330 (e.g., from the UPF 450 and/or application server 460) out of order. The IP sequence number may be used by the scheduler of the CU 310 and/or the DU 330 to prioritize IP packets that are waiting for transmission. Although an IP packet may be a PDCP service data unit (SDU), the PDCP sequence number cannot be used because it cannot identify the first IP packet of an ADU 506. In some aspects, the DU 330 may use RRC signaling to configure the quantity of bits that is required to carry the IP sequence number in the ADU metadata. The configuration can be based on a list of options (e.g. {4, 8, 12, 16 . . . } bits).

The elements of the ADU metadata described above may be transmitted to the UE 120 in an ADU metadata header associated with the packets 504 included in the ADUs 506 of the ADU traffic flow 502. Accordingly, the elements of the ADU metadata may occupy one or more bits in the ADU metadata header. For example, the ADU based service flow flag (e.g., the indication that one or more packets 504 are associated with an ADU traffic flow 502) may be included in a 1-bit field in the ADU metadata header. As another example, the indication of the ADU sequence number may be included in a field having a fixed multiple-bit size in the ADU metadata header. The quantity of bits of the field may be configured to enable identifying an ADU unambiguously either across several bursts 508 of a frame or inside a burst 508 if the ADU burst numbers not part of the ADU metadata. As another example, the indication of the burst sequence number may be included in a field having a fixed multiple-bit size in the ADU metadata header. The quantity of the bits of the field may be configured to support the quantity of bursts 508 inside a frame.

As another example, the indication of the size of an ADU 506 included in the ADU traffic flow 502 may be included in a configurable-sized field in the ADU metadata header. The size of the field may be based at least in part on the flow rate or bandwidth associated with the application and/or may be based at least in part on a traffic type associated with the application. As another example, the quantity of packets 504 included in an ADU 506 may be included in a configurable-size field in the ADU metadata header. The quantity of packets 504 may be based at least in part on the flow rate or bandwidth associated with the application and/or may be based at least in part on a traffic type associated with the application.

As another example, the indication of the ACP may be included in a field having a fixed multiple-bit size (e.g., 7 bits or another quantity of bits that is capable of indicating values from 0 to 100 or another range of values) in the ADU metadata header. As another example, the indication of the ADT may be included in a field having a fixed multiple-bit size in the ADU metadata header. The ADT may be set to approximately 5 times the ADB value, which may result in a range of approximately 50 milliseconds to approximately 300 milliseconds. 8 bits may be used to enable indications in 1 millisecond increments. However, other values are within the scope of the present disclosure. As another example, the indication of the IP packet number or IP sequence number may be included in a configurable-sized field in the ADU metadata header.

The UE 120 may communicate the ADU traffic flow 502 with the application server 460 through the DU 330, through the CU 310, and/or through the UPF 450 using the ADU aware DRB. Moreover, the UE 120 may use the indication of the ADU aware DRB and/or the ADU metadata to track and/or monitor ADU performance parameters for the ADU traffic flow 502. For example, the UE 120 may track and/or monitor AER, ADB, ADT, and/or ACP for the ADU traffic flow 502 based at least in part on the indication of the ADU aware DRB and/or the ADU metadata.

As another example, the UE 120 may determine that one or more packets 504 of an ADU 506 in the ADU traffic flow 502 are missing based at least in part on the quantity of packets 504 included in each ADU 506 in the ADU traffic flow 502 indicated in the ADU metadata. As another example, the UE 120 may determine an ACP for the packets 504 in the ADUs 506 of the ADU traffic flow 502 based at least in part on the size of the ADUs 506 indicated in the ADU metadata. As another example, the UE 120 may determine an ACP for the packets 504 in the ADUs 506 of the ADU traffic flow 502 based at least in part on the indication of the ACP in the ADU metadata. As another example, the UE 120 may determine an ADT for ADUs 506 in the ADU traffic flow 502 based at least in part on the indication of the ADT in the ADU metadata.

As another example, the UE 120 may transmit a report (e.g., in a PDCP control PDU or another type of data unit) of missing packets 504 either by an ADU specific protocol layer or by another protocol layer based at least in part on the ADU metadata. As another example, the UE 120 may transmit a notification that a sufficient quantity of packets 504 of an ADU 506 have been received, or that a quantity of received packets 504 satisfies a quantity threshold. The PDCP PDUs and/or RLC PDUs that are still waiting for transmission or retransmission can be discarded in this case.

As another example, the UE 120 may determine that reception of a PDCP SDU of the PDCP PDU is not required for decoding an ADU associated with the PDCP PDU, may identify, based at least in part on the ADU metadata, at least one of one or more RLC PDUs or one or more RLC PDU segments included in the PDCP SDU, and may transmit an RLC status report, where the one or more RLC PDUs and/or the one or more RLC PDU segments are omitted from the RLC status report. As another example, the UE 120 may determine respective decoding outcomes for each of one or more packets and may provide feedback associated with the respective decoding outcomes based at least in part on the ADU metadata. In some aspects, the UE 120 provides the feedback associated with the respective decoding outcomes to facilitate forward error correction redundancy adaptation for an ADU traffic flow.

FIG. 7C illustrates an example of uplink communication in the ADU signaling architecture 700, which includes the transmission of an ADU traffic flow 502 from the application client 602 on the UE 120 to the application host 604 on the application server 460. As shown in FIG. 7C, the ADU traffic flow 502 may be provided by the application client 602 to the SDAP 702 of the UE 120. The ADU traffic flow 502 may be provided from the SDAP 702 to the PDCP 704, from the PDCP 704 to the RLC 706, from the RLC 706 to the MAC 708, and from the MAC 708 to the PHY 710, and from the PHY 710 of the UE 120 to the PHY 710 of the DU 330 on the Uu interface. The ADU traffic flow 502 may be provided from the PHY 710 of the DU 330 to the MAC 708 of the DU 330, from the MAC 708 to the RLC 706, from the RLC 706 to the GTP-U 716, from the GTP-U 716 to the UDP 714, from the UDP 714 to the IP 712, and from the IP 712 of the DU 330 to the IP 712 of the CU 310 on the F1 interface. The ADU traffic flow 502 may be provided from IP 712 of the CU 310 to the UDP 714 of the CU 310, from the UDP 714 to the GTP-U 716, from the GTP-U 716 to the PDCP 704, from the PDCP 704 to the SDAP 702, from the SDAP 702 to the GTP-U 716, from the GTP-U 716 to the UDP 714, from the UDP 714 to the IP 712, and from the IP 712 of the CU 310 to the IP 712 of the UPF 450 on the N3 interface. The ADU traffic flow 502 may be provided from the IP 712 of the UPF 450 to the UDP 714 of the UPF 450, from the UPF 450 to the service layer 718, and from the service layer 718 of the UPF 450 to the application host 604 of the application server 460.

As further shown in FIG. 7C, the UE 120 provide ADU signaling 720 from the application client 602. The ADU signaling 720 may include ADU metadata associated with the ADU traffic flow 502, which may include information related to the ADUs 506 of the ADU traffic flow 502 and/or information related to the packets 504 of the ADUs 506. The ADU metadata may include information described above in connection with FIG. 7B, among other examples.

As indicated above, FIGS. 7A-7C are provided as examples. Other examples may differ from what is described with regard to FIGS. 7A-7C.

Figure 8A:
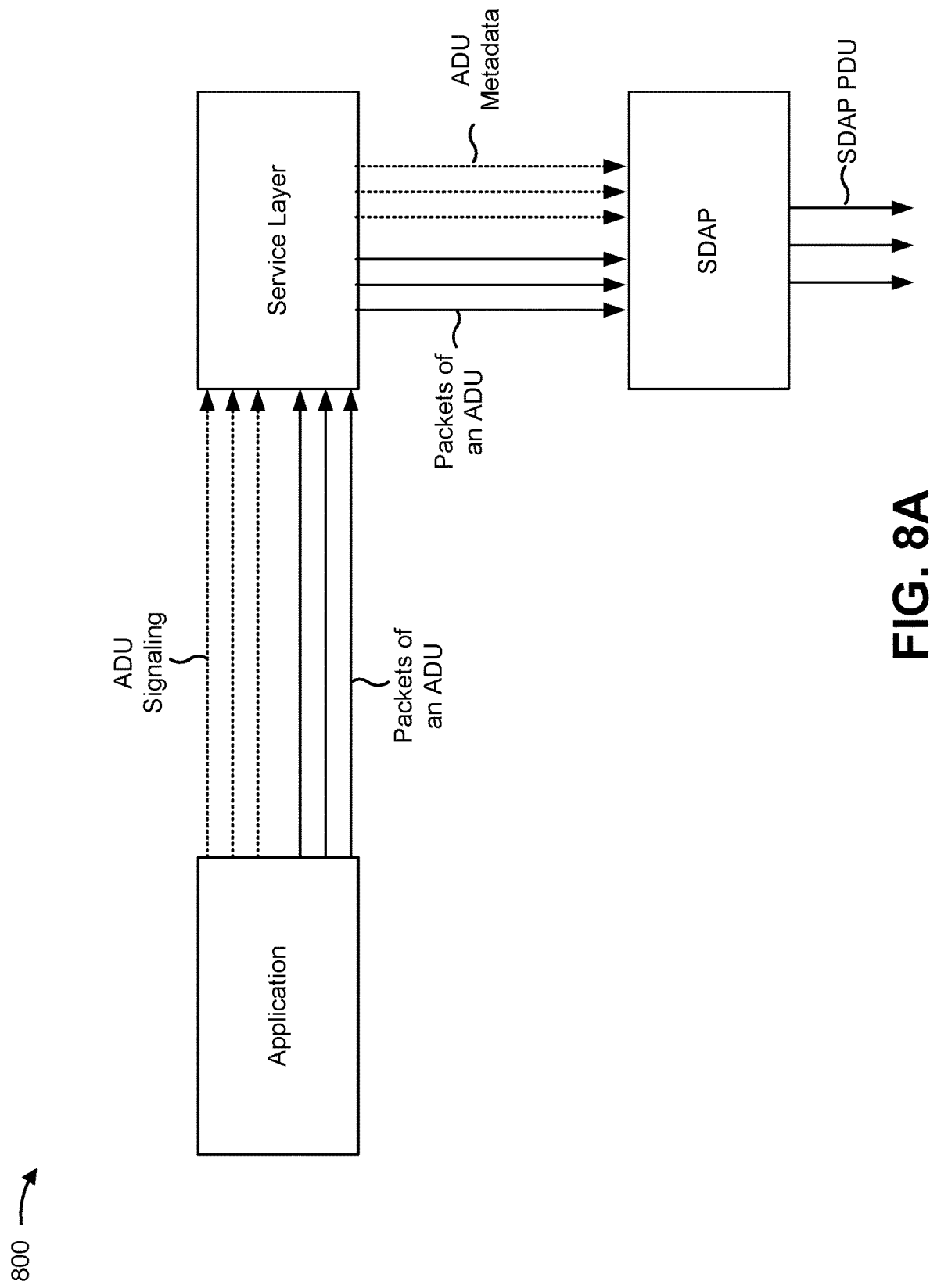
FIGS. 8A-8C and 9A-9C are diagrams illustrating examples associated with ADU metadata signaling, in accordance with the present disclosure.
Figure 8B:
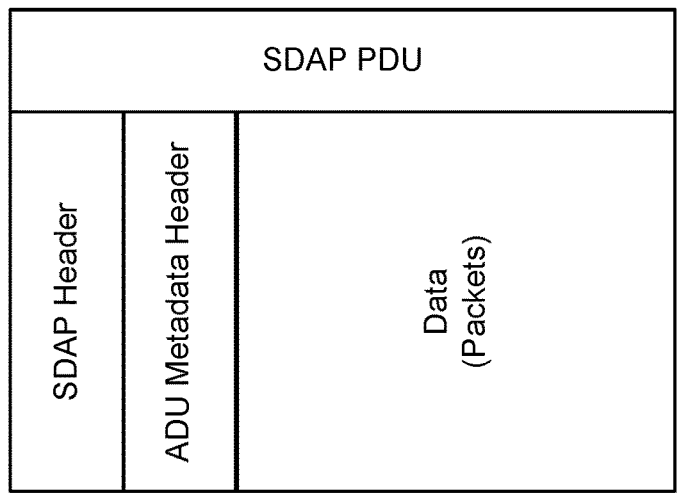
Figure 8C:
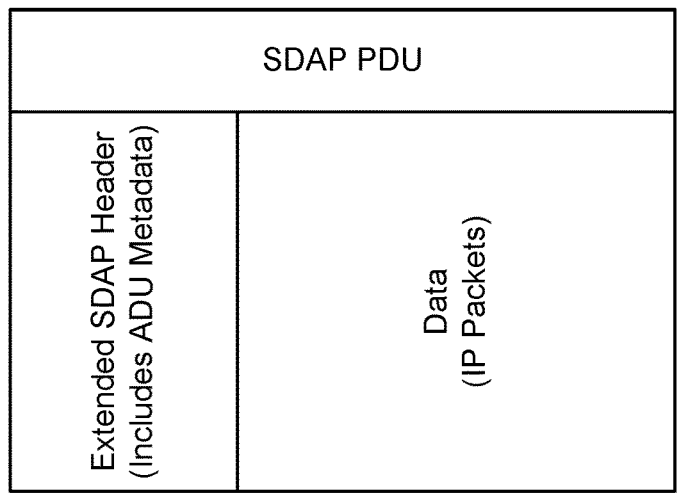

FIGS. 8A-8C are diagrams illustrating examples of ADU metadata signaling, in accordance with the present disclosure. In particular, FIGS. 8A-8C include examples of including ADU metadata in an SDAP PDU.

As shown in an example 800 in FIG. 8A, ADU signaling (e.g., ADU signaling 720) is provided from an application (e.g., an application client 602 of a UE 120, an application host 604 of an application server 460) to a service layer along with packets (e.g., packets 504) of an ADU (e.g., an ADU 506). At the service layer, ADU metadata is generated based at least in part on the ADU signaling and provided along with the packets to an SDAP layer. At the SDAP layer, an SDAP PDU is generated based at least in part on the packets and the ADU metadata.

FIG. 8B illustrates an example 810 of an SDAP PDU format for carrying ADU metadata. As shown in the example 810 in FIG. 8B, the ADU metadata may be included in an ADU metadata header in the SDAP PDU. The ADU metadata header is included between an SDAP header of the SDAP PDU and the data (e.g., the packets) of the SDAP PDU. The example 810 of the SDAP PDU of FIG. 8B may include an SDAP PDU format that is introduced and applied to all flows that are mapped onto an ADU aware DRB.

As the ADU metadata header is not a part of the SDAP header, the ADU metadata header is ciphered such that access to the ADU metadata (and information associated with the application) is restricted. The ADU metadata is used after an integrity protection has been checked, which increases the data security for the ADU metadata. In the downlink for ciphered ADU metadata, the ADU metadata can be signaled from the CU 310 to the DU 330 through an extension of a GTP-U header which that the DU 330 can easily access the ADU metadata for scheduling purposes. In the uplink for ciphered ADU metadata, the DU 330 may provide the ciphered ADU metadata to the CU 310, which performs deciphering for the ADU metadata and provides the deciphered ADU metadata to the DU 330 on the F1 interface for scheduling purposes. The CU 310 may provide the ADU metadata to the DU 330 in an out-of-band communication, in which the ADU metadata is included in a GTP-U header or another type of header.

FIG. 8C illustrates another example 820 of an SDAP PDU format for carrying ADU metadata. As shown in the example 820 in FIG. 8C, the ADU metadata may be included in an SDAP header of the SDAP PDU. The SDAP header may include an extended SDAP header that is introduced for carrying ADU metadata. As the ADU metadata is included in the extended SDAP header, the ADU metadata is not ciphered. This may reduce latency and increase throughput for the application, which may increase the performance and user experience for the application. The example 820 of the SDAP PDU of FIG. 8C may include an SDAP PDU format that is introduced and applied to all flows that are mapped onto an ADU aware DRB.

As indicated above, FIGS. 8A-8C are provided as examples. Other examples may differ from what is described with regard to FIGS. 8A-8C.

Figure 9A:
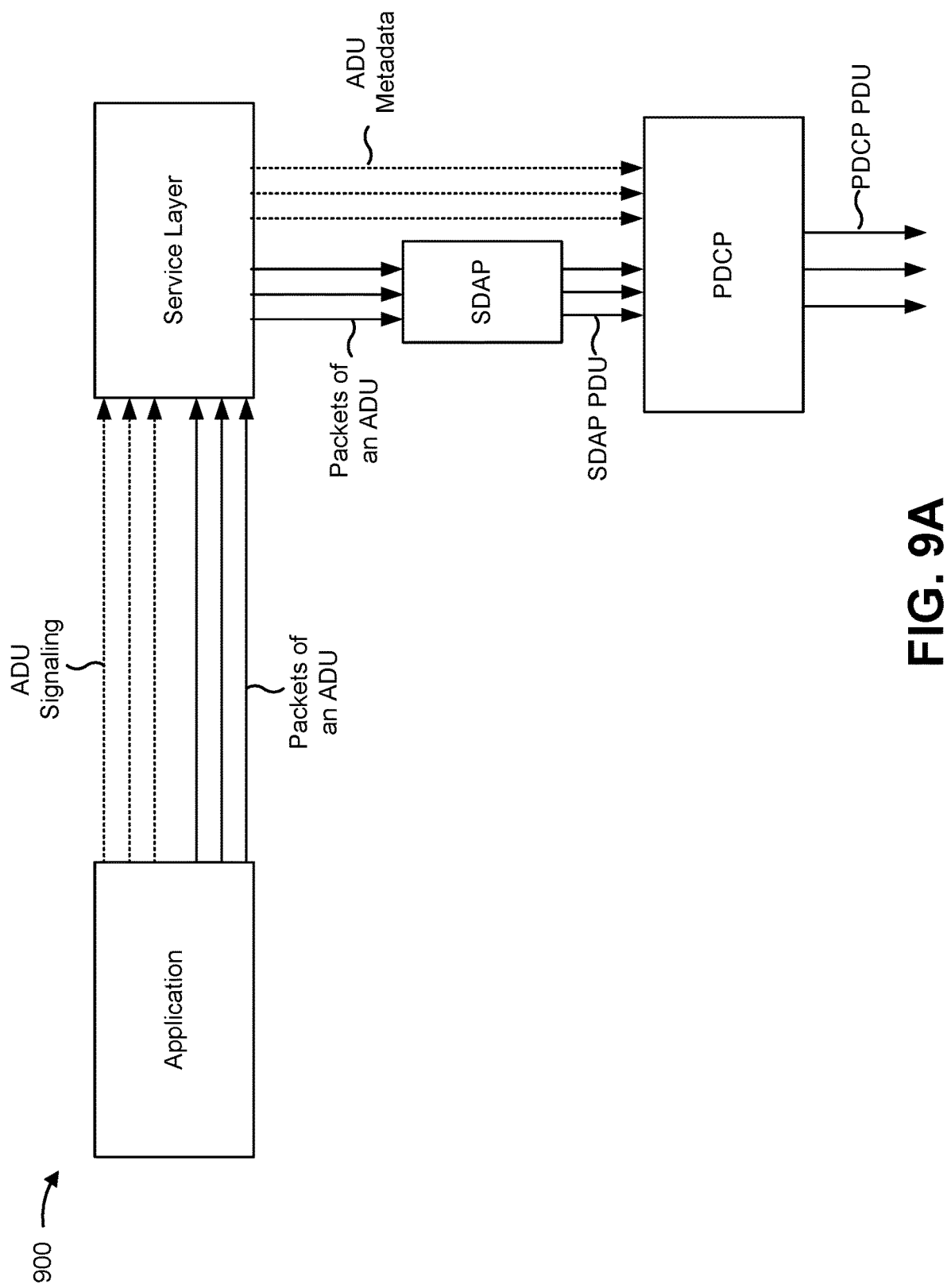
Figure 9B:
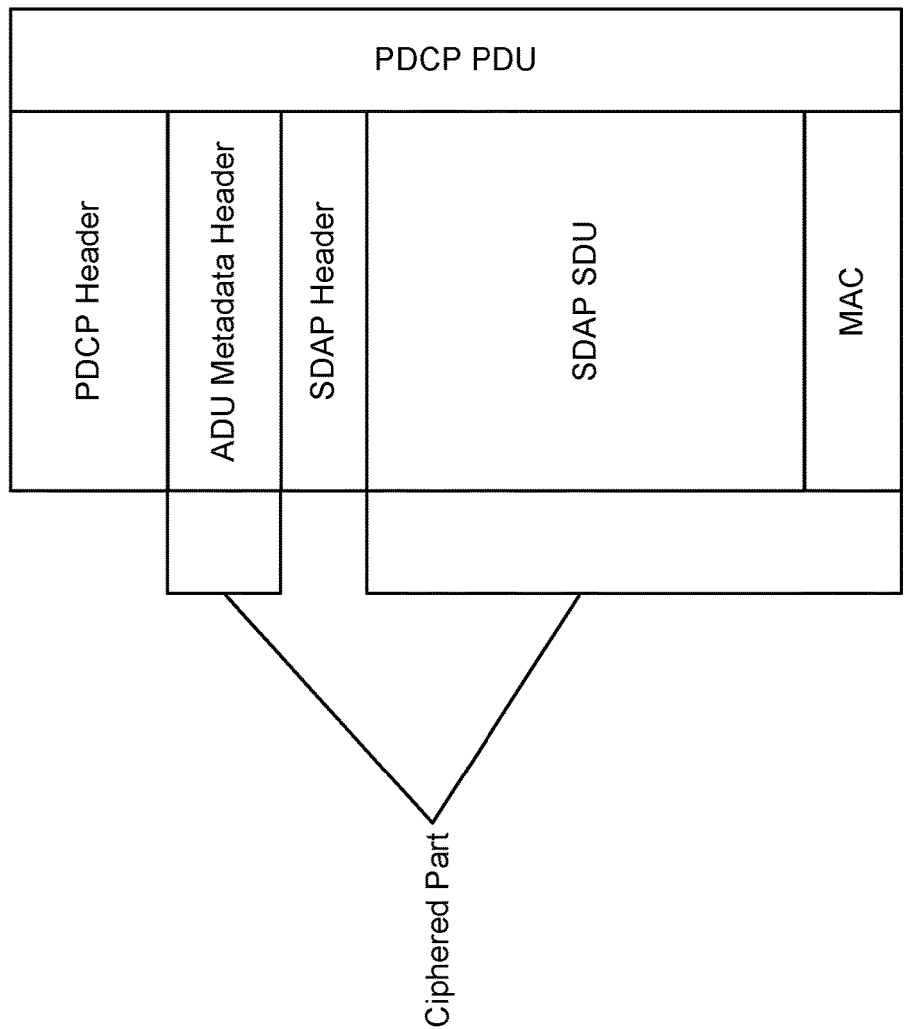
Figure 9C:
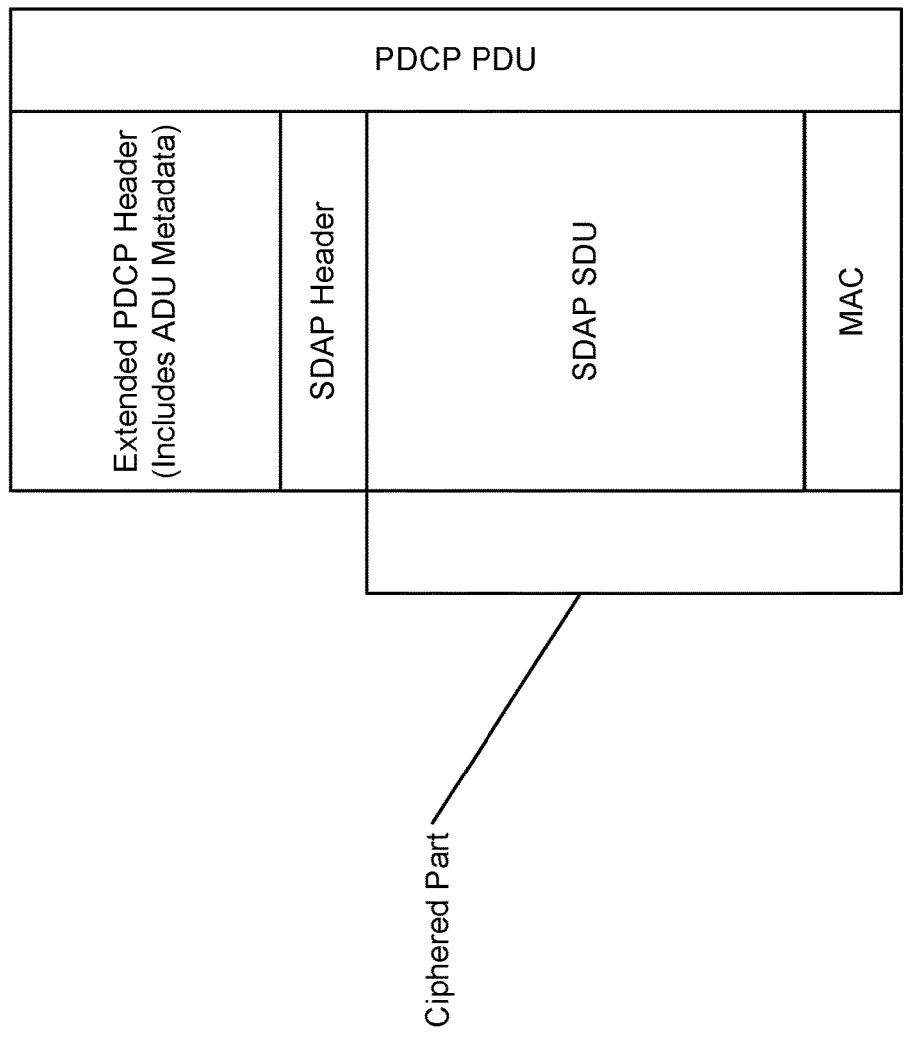

FIGS. 9A-9C are diagrams illustrating examples of ADU metadata signaling, in accordance with the present disclosure. In particular, FIGS. 9A-9C include examples of including ADU metadata in an PDCP PDU.

As shown in an example 900 in FIG. 9A, ADU signaling (e.g., ADU signaling 720) is provided from an application (e.g., an application client 602 of a UE 120, an application host 604 of an application server 460) to a service layer along with packets (e.g., packets 504) of an ADU (e.g., an ADU 506). At the service layer, ADU metadata is generated based at least in part on the ADU signaling and provided along with the packets to an SDAP layer. At the SDAP layer, an SDAP PDU is generated based at least in part on the packets. The SDAP PDU and the ADU metadata are provided to a PDCP layer. Thus, the ADU metadata is forwarded from the service layer to the PDCP layer without modification at the SDAP layer. At the PDCP layer, a PDCP PDU is generated based at least in part on the SDAP PDU and the ADU metadata.

FIG. 9B illustrates an example 910 of a PDCP PDU format for carrying ADU metadata. As shown in the example 910 in FIG. 9B, the ADU metadata may be included in an ADU metadata header in the PDCP PDU. The ADU metadata header is included between a PDCP header of the PDCP PDU an SDAP header of the PDCP PDU. The example 910 of the PDCP PDU of FIG. 9B may include a PDCP PDU format that is introduced and applied to all flows that are mapped onto an ADU aware DRB.

As the ADU metadata header is not a part of the PDCP header, the ADU metadata header is ciphered such that access to the ADU metadata (and information associated with the application) is restricted. The ADU metadata is used after an integrity protection has been checked, which increases the data security for the ADU metadata. In the downlink for ciphered ADU metadata, the ADU metadata can be signaled from the CU 310 to the DU 330 through an extension of a GTP-U header which that the DU 330 can easily access the ADU metadata for scheduling purposes. In the uplink for ciphered ADU metadata, the DU 330 may provide the ciphered ADU metadata to the CU 310, which performs deciphering for the ADU metadata and provides the deciphered ADU metadata to the DU 330 on the F1 interface for scheduling purposes. The CU 310 may provide the ADU metadata to the DU 330 in an out-of-band communication, in which the ADU metadata is included in a GTP-U header or another type of header.

FIG. 9C illustrates another example 920 of a PDCP PDU format for carrying ADU metadata. As shown in the example 920 in FIG. 9C, the ADU metadata may be included in a PDCP header of the PDCP PDU. The PDCP header may include an extended PDCP header that is introduced for carrying ADU metadata. As the ADU metadata is included in the extended PDCP header, the ADU metadata is not ciphered. This may reduce latency and increase throughput for the application, which may increase the performance and user experience for the application. The example 920 of the PDCP PDU of FIG. 9C may include a PDCP PDU format that is introduced and applied to all flows that are mapped onto an ADU aware DRB.

As indicated above, FIGS. 9A-9C are provided as examples. Other examples may differ from what is described with regard to FIGS. 9A-9C.

In some aspects, ADU metadata is included at the MAC layer in a MAC header. For example, ADU metadata may be included in an extended sub-header of a MAC SDU, in which case the ADU metadata is not ciphered. A MAC SDU may include an IP packet or a segment of an IP packet, and ADU metadata for the packet inserted into a sub-header.

Figure 10:
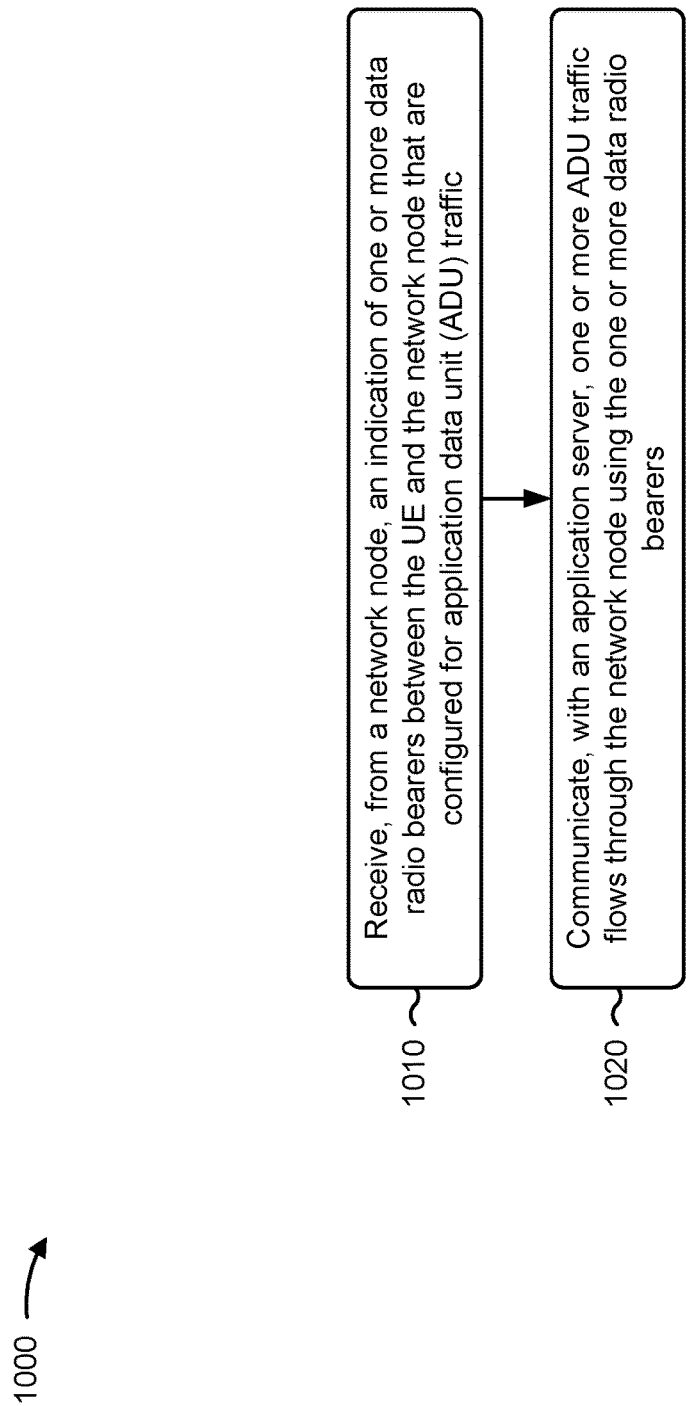
FIGS. 10-14 are diagrams illustrating example processes associated with ADU metadata signaling, in accordance with the present disclosure.

FIG. 10 is a diagram illustrating an example process 1000 performed, for example, by a UE in accordance with the present disclosure. Example process 1000 is an example where the UE (e.g., UE 120) performs operations associated with ADU metadata signaling.

As shown in FIG. 10, in some aspects, process 1000 may include receiving, from a network node, an indication of one or more data radio bearers between the UE and the network node that are configured for ADU traffic (block 1010). For example, the UE (e.g., using communication manager 140 and/or reception component 1502, depicted in FIG. 15) may receive, from a network node, an indication of one or more data radio bearers between the UE and the network node that are configured for ADU traffic, as described above.

As further shown in FIG. 10, in some aspects, process 1000 may include communicating, with an application server, one or more ADU traffic flows through the network node using the one or more data radio bearers (block 1020). For example, the UE (e.g., using communication manager 140, reception component 1502, and/or transmission component 1504, depicted in FIG. 15) may communicate, with an application server, one or more ADU traffic flows through the network node using the one or more data radio bearers, as described above.

Process 1000 may include additional aspects, such as any single aspect or any combination of aspects described below and/or in connection with one or more other processes described elsewhere herein.

In a first aspect, receiving the indication of the one or more data radio bearers comprises receiving, in an RRC communication, the indication of the one or more data radio bearers.

In a second aspect, alone or in combination with the first aspect, communicating the one or more ADU traffic flows with the application server comprises receiving, on a data radio bearer of the one or more data radio bearers, an ADU of an ADU traffic flow included in the one or more ADU traffic flows, and at least one of determining that one or more IP packets, of a plurality of IP packets of the ADU, are missing, determining an ADU content policy for the plurality of IP packets of the ADU, transmitting a PDCP control PDU that identifies the one or more IP packets that are missing, or transmitting an indication that a quantity of received IP packets of the plurality of IP packets of the ADU satisfies a quantity threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
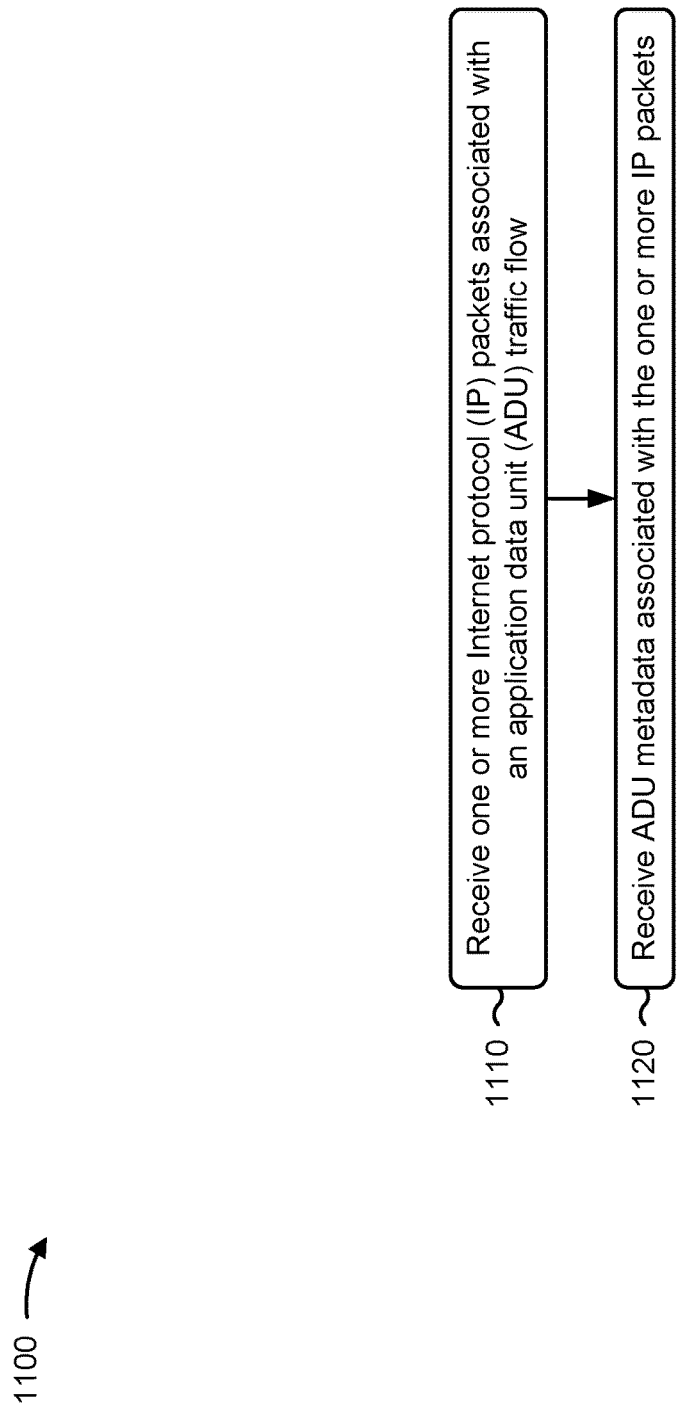

FIG. 11 is a diagram illustrating an example process 1100 performed, for example, by a UE, in accordance with the present disclosure. Example process 1100 is an example where the UE (e.g., UE 120) performs operations associated with ADU metadata signaling.

As shown in FIG. 11, in some aspects, process 1100 may include receiving one or more IP packets associated with an ADU traffic flow (block 1110). For example, the UE (e.g., using communication manager 140 and/or reception component 1502, depicted in FIG. 15) may receive one or more IP packets associated with an ADU traffic flow, as described above.

As further shown in FIG. 11, in some aspects, process 1100 may include receiving ADU metadata associated with the one or more IP packets (block 1120). For example, the UE (e.g., using communication manager 140 and/or reception component 1502, depicted in FIG. 15) may receive ADU metadata associated with the one or more IP packets, as described above.

Process 1100 may include additional aspects, such as any single aspect or any combination of aspects described below and/or in connection with one or more other processes described elsewhere herein.

In a first aspect, the ADU metadata includes at least one of an indication that the one or more IP packets are associated with the ADU traffic flow, an indication of a QoS flow associated with the one or more IP packets, an indication of an ADU in which the one or more IP packets are included, an indication of a size of the ADU, an indication of a quantity of IP packets included in the ADU, or an indication of a respective IP packet number for each of the one or more IP packets.

In a second aspect, alone or in combination with the first aspect, the ADU metadata is included in an ADU metadata header associated with the one or more IP packets, wherein the ADU metadata header includes a plurality of fields that are configured to indicate the ADU metadata.

In a third aspect, alone or in combination with one or more of the first and second aspects, the plurality of fields include at least one of a 1-bit field indicating that the one or more IP packets are associated with the ADU traffic flow, a first multiple-bit field indicating a QoS flow associated with the one or more IP packets, a second multiple-bit field indicating an ADU in which the one or more IP packets are included, a first configurable-sized field indicating a size of the ADU, a second configurable-sized field indicating a quantity of IP packets included in the ADU, or a third configurable-sized field indicating a respective IP packet number for each of the one or more IP packets.

In a fourth aspect, alone or in combination with one or more of the first through third aspects, process 1100 includes receiving an RRC configuration that indicates a size of at least a subset of the plurality of fields.

In a fifth aspect, alone or in combination with one or more of the first through fourth aspects, receiving the ADU metadata comprises receiving the ADU metadata in an SDAP PDU.

In a sixth aspect, alone or in combination with one or more of the first through fifth aspects, the ADU metadata is included between an SDAP header of the SDAP PDU and data of the SDAP PDU, and wherein the data of the SDAP PDU includes the one or more IP packets.

In a seventh aspect, alone or in combination with one or more of the first through sixth aspects, receiving the ADU metadata comprises receiving the ADU metadata in a PDCP PDU.

In an eighth aspect, alone or in combination with one or more of the first through seventh aspects, the ADU metadata is included in a ciphered part of the PDCP PDU between a header of the PDCP PDU and a PDCP SDU of the PDCP PDU, and wherein the PDCP SDU includes the one or more IP packets.

In a ninth aspect, alone or in combination with one or more of the first through eighth aspects, the ADU metadata is included in a non-ciphered part of the PDCP PDU.

In a tenth aspect, alone or in combination with one or more of the first through ninth aspects, the ADU metadata is included in an extended PDCP header of the PDCP PDU.

In an eleventh aspect, alone or in combination with one or more of the first through tenth aspects, process 1100 includes determining that reception of a PDCP SDU of the PDCP PDU is not required for decoding an ADU associated with the PDCP PDU, identifying, based at least in part on the ADU metadata, at least one of one or more RLC PDUs or one or more RLC PDU segments included in the PDCP SDU, and transmitting an RLC status report, wherein the at least one of the one or more RLC PDUs or the one or more RLC PDU segments are omitted from the RLC status report.

In a twelfth aspect, alone or in combination with one or more of the first through eleventh aspects, process 1100 includes determining respective decoding outcomes for each of the one or more IP packets, and providing feedback associated with the respective decoding outcomes.

In a thirteenth aspect, alone or in combination with one or more of the first through twelfth aspects, providing the feedback associated with the respective decoding outcomes comprises providing the feedback associated with the respective decoding outcomes to facilitate forward error correction redundancy adaptation for the ADU traffic flow.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
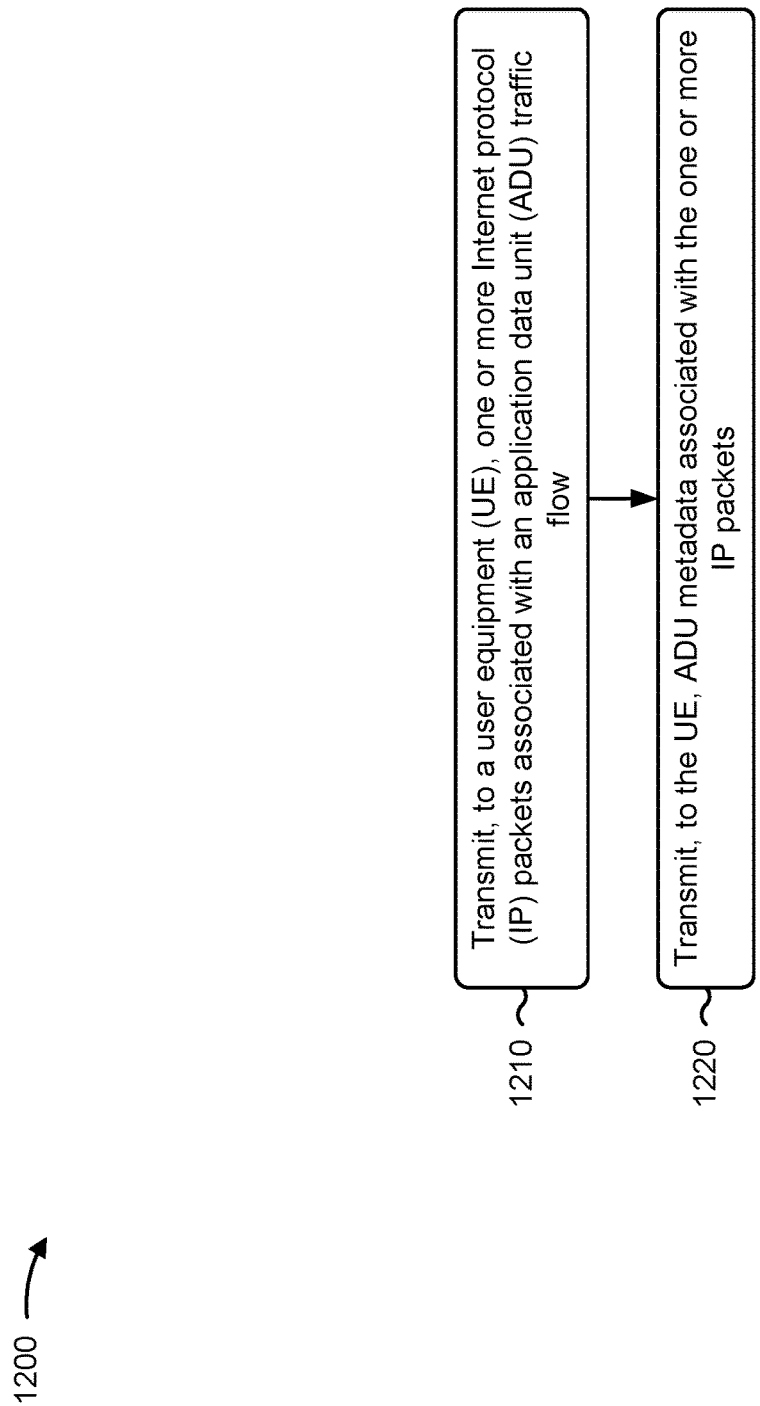

FIG. 12 is a diagram illustrating an example process 1200 performed, for example, by a network node, in accordance with the present disclosure. Example process 1200 is an example where the network node (e.g., a base station 110, a CU 310, a DU 330, an RU 340, a UPF 450) performs operations associated with ADU metadata signaling.

As shown in FIG. 12, in some aspects, process 1200 may include transmitting, to a UE, one or more IP packets associated with an ADU traffic flow (block 1210). For example, the network node (e.g., using communication manager 150 and/or transmission component 1604, depicted in FIG. 16) may transmit, to a UE, one or more IP packets associated with an ADU traffic flow, as described above.

As further shown in FIG. 12, in some aspects, process 1200 may include transmitting, to the UE, ADU metadata associated with the one or more IP packets (block 1220). For example, the network node (e.g., using communication manager 150 and/or transmission component 1604, depicted in FIG. 16) may transmit, to the UE, ADU metadata associated with the one or more IP packets, as described above.

Process 1200 may include additional aspects, such as any single aspect or any combination of aspects described below and/or in connection with one or more other processes described elsewhere herein.

In a first aspect, the ADU metadata includes at least one of an indication that the one or more IP packets are associated with the ADU traffic flow, an indication of a QoS flow associated with the one or more IP packets, an indication of an ADU in which the one or more IP packets are included, an indication of a size of the ADU, an indication of a quantity of IP packets included in the ADU, or an indication of a respective IP packet number for each of the one or more IP packets.

In a second aspect, alone or in combination with the first aspect, the ADU metadata is included in an ADU metadata header associated with the one or more IP packets, wherein the ADU metadata header includes a plurality of fields that are configured to indicate the ADU metadata.

In a third aspect, alone or in combination with one or more of the first and second aspects, the plurality of fields include at least one of a 1-bit field indicating that the one or more IP packets are associated with the ADU traffic flow, a first multiple-bit field indicating a QoS flow associated with the one or more IP packets, a second multiple-bit field indicating an ADU in which the one or more IP packets are included, a first configurable-sized field indicating a size of the ADU, a second configurable-sized field indicating a quantity of IP packets included in the ADU, or a third configurable-sized field indicating a respective IP packet number for each of the one or more IP packets.

In a fourth aspect, alone or in combination with one or more of the first through third aspects, process 1200 includes transmitting, to the UE, an RRC configuration that indicates a respective size of at least a subset of the plurality of fields.

In a fifth aspect, alone or in combination with one or more of the first through fourth aspects, transmitting the ADU metadata comprises transmitting the ADU metadata in an SDAP PDU.

In a sixth aspect, alone or in combination with one or more of the first through fifth aspects, the ADU metadata is included between an SDAP header of the SDAP PDU and data of the SDAP PDU, and wherein the data of the SDAP PDU includes the one or more IP packets.

In a seventh aspect, alone or in combination with one or more of the first through sixth aspects, transmitting the ADU metadata comprises transmitting the ADU metadata in a PDCP PDU.

In an eighth aspect, alone or in combination with one or more of the first through seventh aspects, the ADU metadata is included in a ciphered part of the PDCP PDU between a header of the PDCP PDU and a PDCP SDU of the PDCP PDU, and wherein the PDCP SDU includes the one or more IP packets.

In a ninth aspect, alone or in combination with one or more of the first through eighth aspects, process 1200 includes receiving the ADU metadata in an out-of-band communication from another network node, wherein the ADU metadata is included in a GTP-U header of the out-of-band communication.

In a tenth aspect, alone or in combination with one or more of the first through ninth aspects, the ADU metadata is included in a non-ciphered part of the PDCP PDU.

In an eleventh aspect, alone or in combination with one or more of the first through tenth aspects, the ADU metadata is included in an extended PDCP header of the PDCP PDU.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
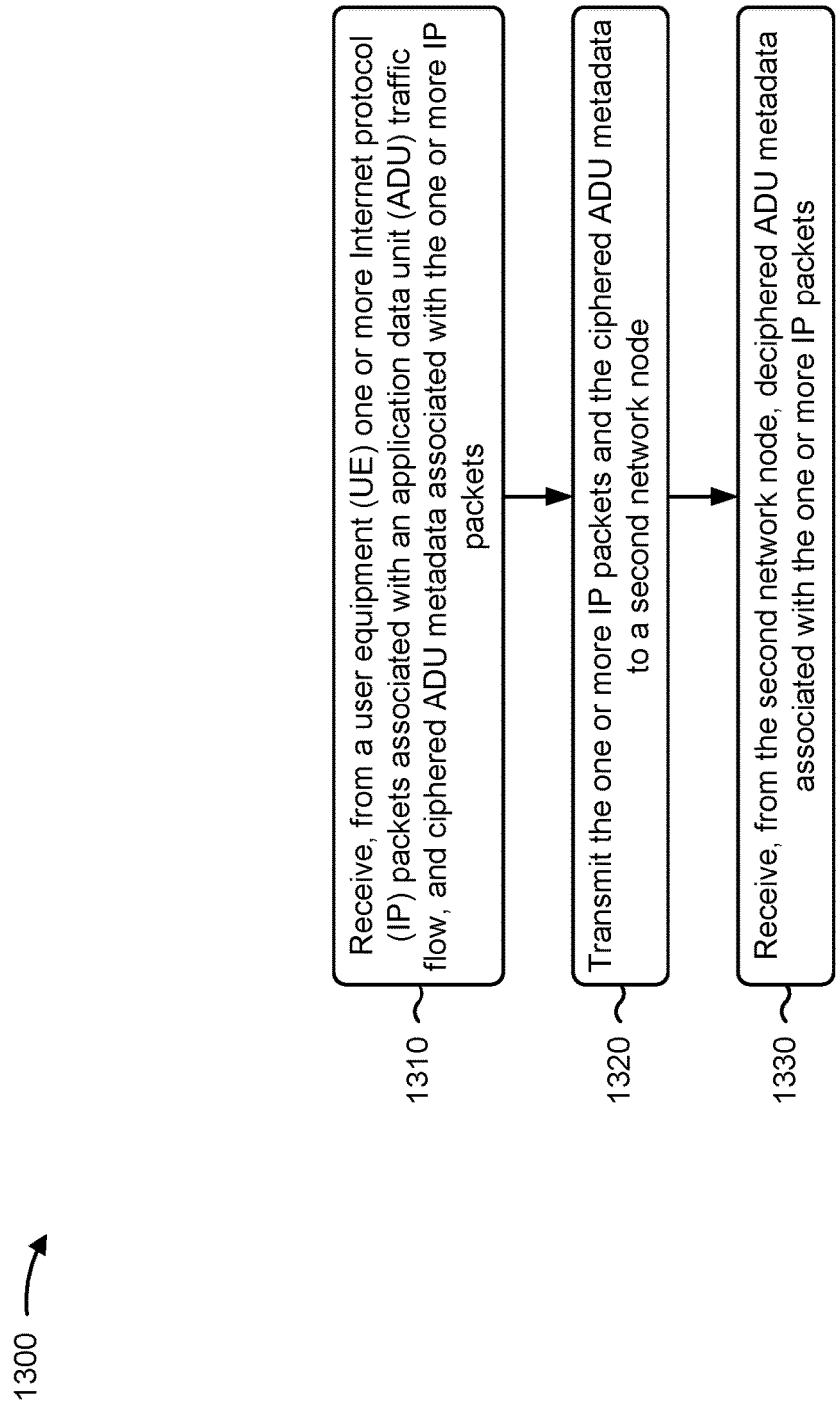

FIG. 13 is a diagram illustrating an example process 1300 performed, for example, by a first network node, in accordance with the present disclosure. Example process 1300 is an example where the first network node (e.g., a base station 110, a CU 310, a DU 330, an RU 340, a UPF 450) performs operations associated with ADU metadata signaling.

As shown in FIG. 13, in some aspects, process 1300 may include receiving, from a UE, one or more IP packets associated with an ADU traffic flow, and ciphered ADU metadata associated with the one or more IP packets (block 1310). For example, the first network node (e.g., using communication manager 150 and/or reception component 1602, depicted in FIG. 16) may receive, from a UE, one or more IP packets associated with an ADU traffic flow and ciphered ADU metadata associated with the one or more IP packets, as described above.

As further shown in FIG. 13, in some aspects, process 1300 may include transmitting the one or more IP packets and the ciphered ADU metadata to a second network node (block 1320). For example, the first network node (e.g., using communication manager 150 and/or transmission component 1604, depicted in FIG. 16) may transmit the one or more IP packets and the ciphered ADU metadata to a second network node, as described above.

As further shown in FIG. 13, in some aspects, process 1300 may include receiving, from the second network node, deciphered ADU metadata associated with the one or more IP packets (block 1330). For example, the first network node (e.g., using communication manager 150 and/or reception component 1602, depicted in FIG. 16) may receive, from the second network node, deciphered ADU metadata associated with the one or more IP packets, as described above.

Process 1300 may include additional aspects, such as any single aspect or any combination of aspects described below and/or in connection with one or more other processes described elsewhere herein.

In a first aspect, receiving the deciphered ADU metadata comprises receiving the deciphered ADU metadata on an F1 interface.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
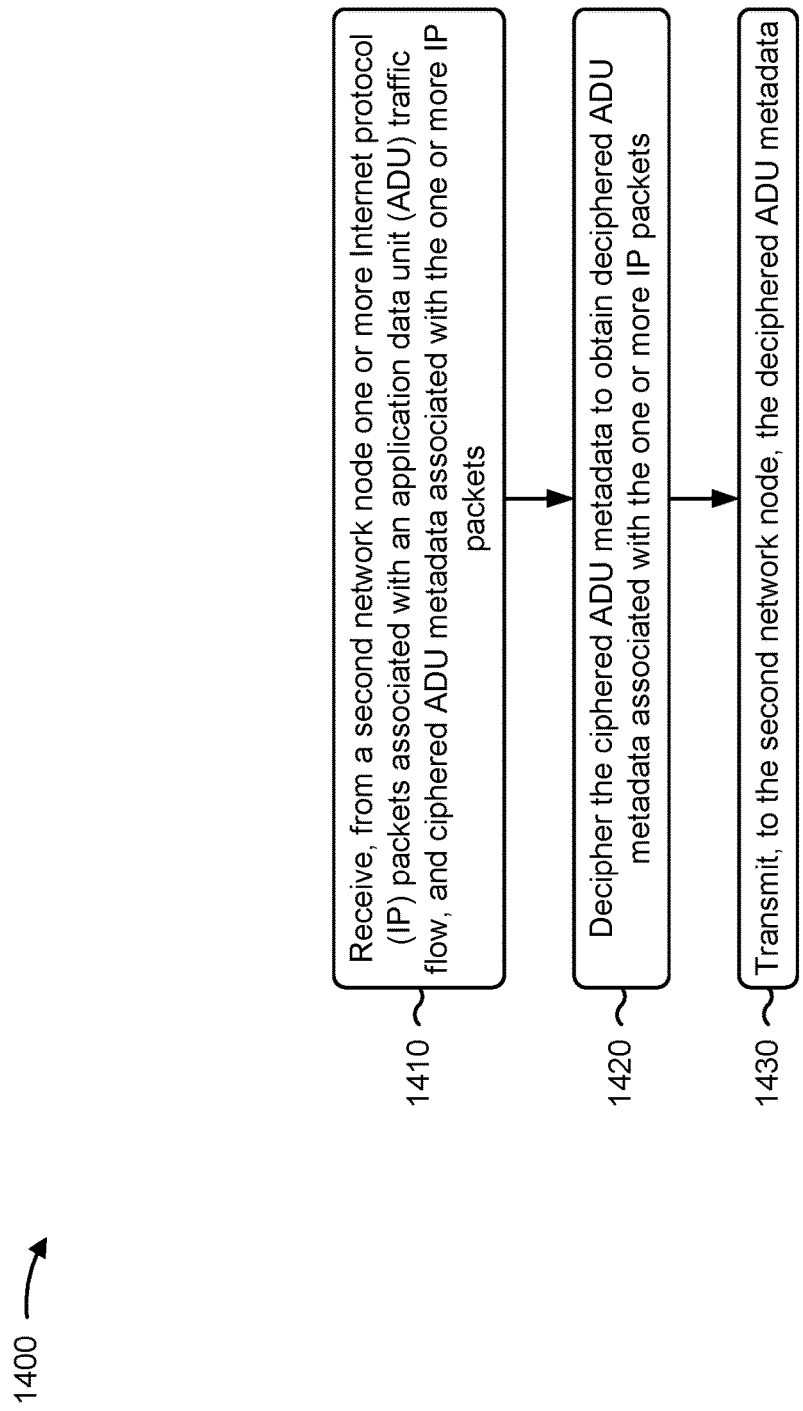

FIG. 14 is a diagram illustrating an example process 1400 performed, for example, by a first network node, in accordance with the present disclosure. Example process 1400 is an example where the first network node (e.g., a base station 110, a CU 310, a DU 330, an RU 340, a UPF 450) performs operations associated with ADU metadata signaling.

As shown in FIG. 14, in some aspects, process 1400 may include receiving, from a second network node, one or more IP packets associated with an ADU traffic flow and ciphered ADU metadata associated with the one or more IP packets (block 1410). For example, the first network node (e.g., using communication manager 150 and/or reception component 1602, depicted in FIG. 16) may receive, from a second network node, one or more IP packets associated with an ADU traffic flow and ciphered ADU metadata associated with the one or more IP packets, as described above.

As further shown in FIG. 14, in some aspects, process 1400 may include deciphering the ciphered ADU metadata to obtain deciphered ADU metadata associated with the one or more IP packets (block 1420). For example, the first network node (e.g., using communication manager 150 and/or deciphering component 1608, depicted in FIG. 16) may decipher the ciphered ADU metadata to obtain deciphered ADU metadata associated with the one or more IP packets, as described above.

As further shown in FIG. 14, in some aspects, process 1400 may include transmitting, to the second network node, the deciphered ADU metadata (block 1430). For example, the first network node (e.g., using communication manager 150 and/or transmission component 1604, depicted in FIG. 16) may transmit, to the second network node, the deciphered ADU metadata, as described above.

Process 1400 may include additional aspects, such as any single aspect or any combination of aspects described below and/or in connection with one or more other processes described elsewhere herein.

In a first aspect, transmitting the deciphered ADU metadata comprises transmitting the deciphered ADU metadata on an F1 interface.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
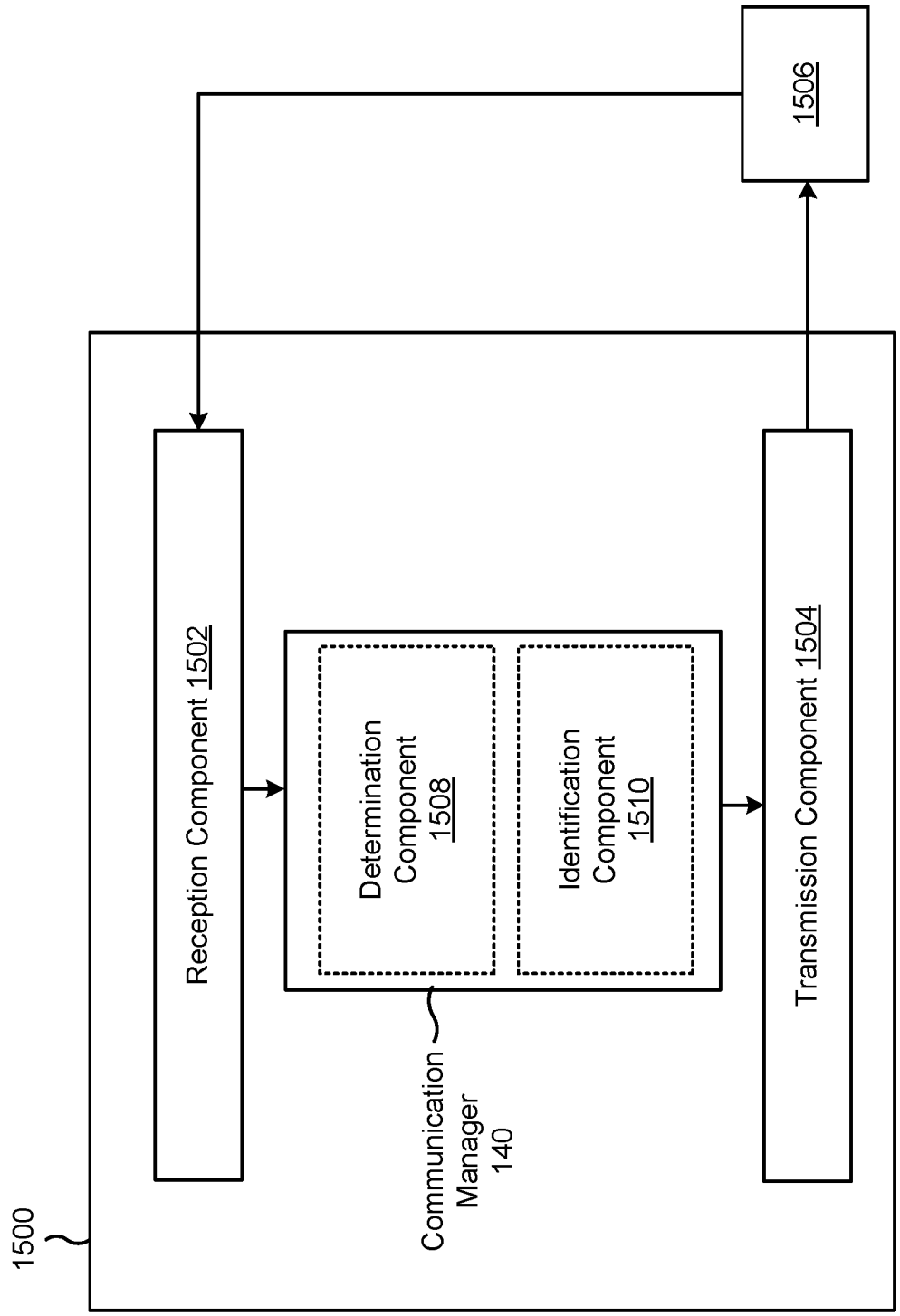
FIGS. 15 and 16 are diagrams of example apparatuses for wireless communication, in accordance with the present disclosure.

FIG. 15 is a diagram of an example apparatus 1500 for wireless communication. The apparatus 1500 may be a UE (e.g., a UE 120), or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, a DU, a CU, an RU, an application server, a UPF, or another communication device) using the reception component 1502 and the transmission component 1504. As further shown, the apparatus 1500 may include the communication manager 140. The communication manager 140 may include a determination component 1508, an identification component 1510, and/or another component.

In some aspects, the apparatus 1500 may be configured to perform one or more operations described herein in connection with FIGS. 5-9C. Additionally, or alternatively, the apparatus 1500 may be configured to perform one or more processes described herein, such as process 1000 of FIG. 10, process 1100 of FIG. 11, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

In some aspects, the reception component 1502 may receive, from an apparatus 1606 (e.g., an a network node such as a base station 110, a CU 310, a DU 330, an RU 340, a UPF 450), an indication of one or more data radio bearers between the apparatus 1600 and the apparatus 1606 that are configured for ADU traffic. In some aspects, the reception component 1502 and/or the transmission component 1504 may communicate, with an application server, one or more ADU traffic flows through the apparatus 1606 using the one or more data radio bearers.

In some aspects, the reception component 1502 may receive one or more IP packets associated with an ADU traffic flow. The reception component 1502 may receive ADU metadata associated with the one or more IP packets.

In some aspects, the reception component 1502 may receive an RRC configuration that indicates a size of at least a subset of a plurality of fields in which the ADU metadata is included.

In some aspects, the determination component 1508 may determine that reception of a PDCP SDU of the PDCP PDU is not required for decoding an ADU associated with the PDCP PDU.

In some aspects, the identification component 1510 may identify, based at least in part on the ADU metadata, at least one of one or more RLC PDUs or one or more RLC PDU segments included in the PDCP SDU.

In some aspects, the transmission component 1504 may transmit an RLC status report, where the at least one of the one or more RLC PDUs or the one or more RLC PDU segments are omitted from the RLC status report.

In some aspects, the determination component 1508 may determine respective decoding outcomes for each of the one or more IP packets.

In some aspects, the transmission component 1504 may provide feedback associated with the respective decoding outcomes.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
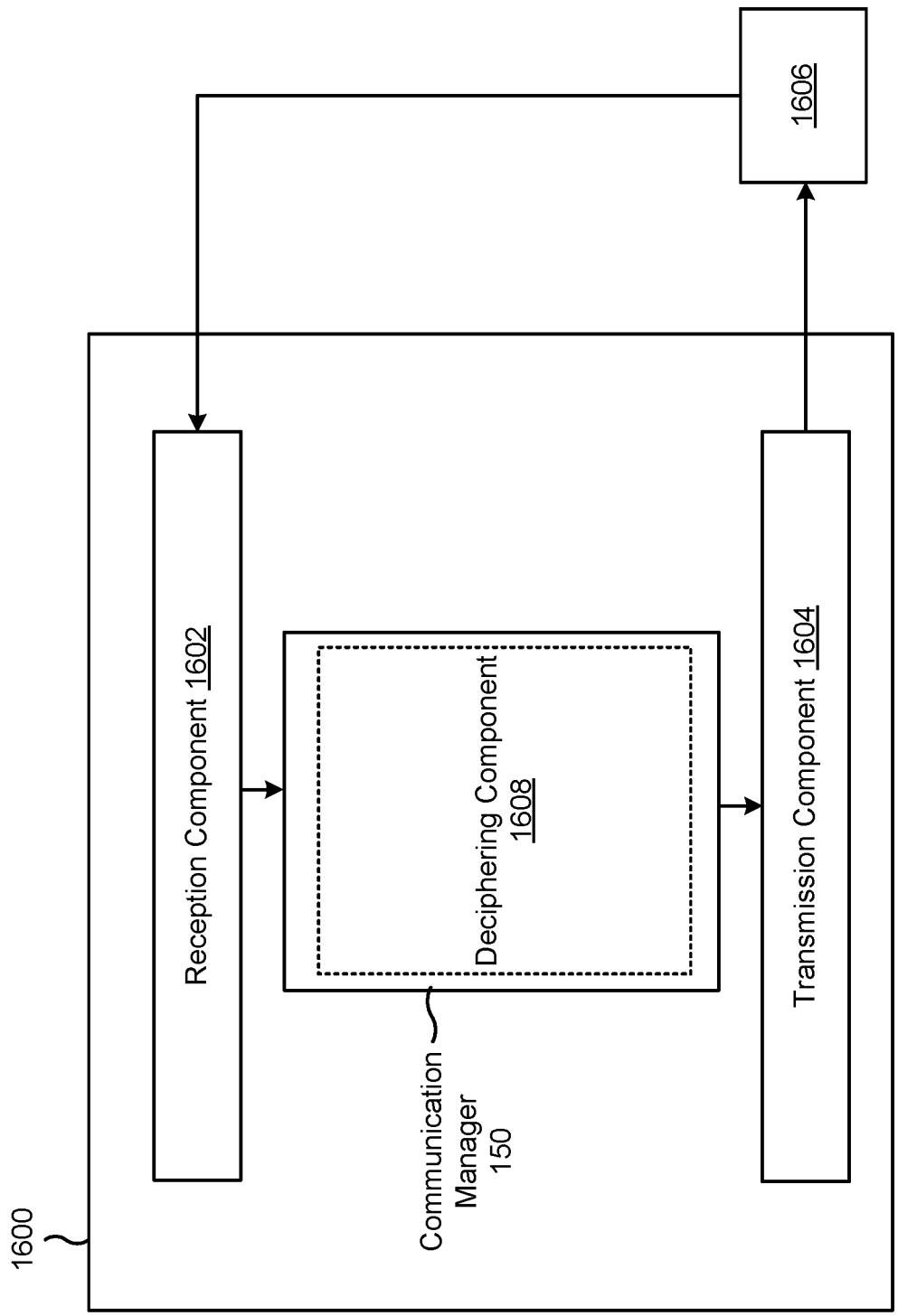

FIG. 16 is a diagram of an example apparatus 1600 for wireless communication. The apparatus 1600 may be a network node (e.g., a base station 110, a CU 310, a DU 330, an RU 340, a UPF 450), or a network node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a deciphering component 1608.

In some aspects, the apparatus 1600 may be configured to perform one or more operations described herein in connection with FIGS. 5-9C. Additionally, or alternatively, the apparatus 1600 may be configured to perform one or more processes described herein, such as process 1200 of FIG. 12, process 1300 of FIG. 13, process 1400 of FIG. 14, or a combination thereof. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

In some aspects, the transmission component 1604 may transmit, to an apparatus 1606 (e.g., a UE), one or more IP packets associated with an ADU traffic flow. In some aspects, the transmission component 1604 may transmit, to the apparatus 1606, ADU metadata associated with the one or more IP packets.

In some aspects, the transmission component 1604 may transmit, to the apparatus 1606, an RRC configuration that indicates a respective size of at least a subset of the plurality of fields.

In some aspects, the reception component 1602 may receive the ADU metadata in an out-of-band communication from another apparatus 1606 (e.g., another network node), where the ADU metadata is included in a GTP-U header of the out-of-band communication.

In some aspects, the reception component 1602 may receive, from an apparatus 1606 (e.g., a UE), one or more IP packets associated with an ADU traffic flow and ciphered ADU metadata associated with the one or more IP packets. In some aspects, the transmission component 1604 may transmit the one or more IP packets and the ciphered ADU metadata to another apparatus 1606 (e.g., another network node). In some aspects, the reception component 1602 may receive, from the other apparatus 1606, deciphered ADU metadata associated with the one or more IP packets.

In some aspects, the reception component 1602 may receive, from an apparatus 1606 (e.g., another network node), one or more IP packets associated with an ADU traffic flow and ciphered ADU metadata associated with the one or more IP packets. In some aspects, the deciphering component 1608 may decipher the ciphered ADU metadata to obtain deciphered ADU metadata associated with the one or more IP packets. In some aspects, the transmission component 1604 may transmit, to the apparatus 1606, the deciphered ADU metadata.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: receiving, from a network node, an indication of one or more data radio bearers between the UE and the network node that are configured for application data unit (ADU) traffic; and communicating, with an application server, one or more ADU traffic flows through the network node using the one or more data radio bearers.

Aspect 2: The method of Aspect 1, wherein receiving the indication of the one or more data radio bearers comprises: receiving, in a radio resource control (RRC) communication, the indication of the one or more data radio bearers.

Aspect 3: The method of Aspect 1 or 2, wherein communicating the one or more ADU traffic flows with the application server comprises: receiving, on a data radio bearer of the one or more data radio bearers, an ADU of an ADU traffic flow included in the one or more ADU traffic flows; and at least one of: determining that one or more Internet protocol (IP) packets, of a plurality of IP packets of the ADU, are missing, determining an ADU content policy for the plurality of IP packets of the ADU, transmitting a packet data convergence protocol (PDCP) control protocol data unit (PDU) that identifies the one or more IP packets that are missing, or transmitting an indication that a quantity of received IP packets of the plurality of IP packets of the ADU satisfies a quantity threshold.

Aspect 4: A method of wireless communication performed by a user equipment (UE), comprising: receiving one or more Internet protocol (IP) packets associated with an application data unit (ADU) traffic flow; and receiving ADU metadata associated with the one or more IP packets.

Aspect 5: The method of Aspect 4, wherein the ADU metadata includes at least one of: an indication that the one or more IP packets are associated with the ADU traffic flow, an indication of a quality of service (QoS) flow associated with the one or more IP packets, an indication of an ADU in which the one or more IP packets are included, an indication of a size of the ADU, an indication of a quantity of IP packets included in the ADU, or an indication of a respective IP packet number for each of the one or more IP packets.

Aspect 6: The method of Aspect 4 or 5, wherein the ADU metadata is included in an ADU metadata header associated with the one or more IP packets, wherein the ADU metadata header includes a plurality of fields that are configured to indicate the ADU metadata.

Aspect 7: The method of Aspect 6, wherein the plurality of fields include at least one of: a 1-bit field indicating that the one or more IP packets are associated with the ADU traffic flow, a first multiple-bit field indicating a quality of service (QoS) flow associated with the one or more IP packets, a second multiple-bit field indicating an ADU in which the one or more IP packets are included, a first configurable-sized field indicating a size of the ADU, a second configurable-sized field indicating a quantity of IP packets included in the ADU, or a third configurable-sized field indicating a respective IP packet number for each of the one or more IP packets.

Aspect 8: The method of Aspect 6, further comprising: receiving a radio resource control (RRC) configuration that indicates a size of at least a subset of the plurality of fields.

Aspect 9: The method of one or more of Aspects 4-8, wherein receiving the ADU metadata comprises: receiving the ADU metadata in a service data access protocol (SDAP) protocol data unit (PDU) or in an extended sub-header of a medium access control (MAC) service data unit (SDU).

Aspect 10: The method of Aspect 9, wherein the ADU metadata is included between an SDAP header of the SDAP PDU and data of the SDAP PDU, and wherein the data of the SDAP PDU includes the one or more IP packets.

Aspect 11: The method of one or more of Aspects 4-10, wherein receiving the ADU metadata comprises: receiving the ADU metadata in a packet data convergence protocol (PDCP) protocol data unit (PDU).

Aspect 12: The method of Aspect 11, wherein the ADU metadata is included in a ciphered part of the PDCP PDU between a header of the PDCP PDU and a PDCP service data unit (SDU) of the PDCP PDU, and wherein the PDCP SDU includes the one or more IP packets.

Aspect 13: The method of Aspect 11 or 12, wherein the ADU metadata is included in a non-ciphered part of the PDCP PDU.

Aspect 14: The method of one or more of Aspects 11-13, wherein the ADU metadata is included in an extended PDCP header of the PDCP PDU.

Aspect 15: The method of one or more of Aspects 11-14, further comprising: determining that reception of a PDCP service data unit (SDU) of the PDCP PDU is not required for decoding an ADU associated with the PDCP PDU; identifying, based at least in part on the ADU metadata, at least one of one or more radio link control (RLC) PDUs or one or more RLC PDU segments included in the PDCP SDU; and transmitting an RLC status report, wherein the at least one of the one or more RLC PDUs or the one or more RLC PDU segments are omitted from the RLC status report.

Aspect 16: The method of one or more of Aspects 4-15, further comprising: determining respective decoding outcomes for each of the one or more IP packets; and providing feedback associated with the respective decoding outcomes.

Aspect 17: The method of Aspect 16, wherein providing the feedback associated with the respective decoding outcomes comprises: providing the feedback associated with the respective decoding outcomes to facilitate forward error correction redundancy adaptation for the ADU traffic flow.

Aspect 18: A method of wireless communication performed by a network node, comprising: transmitting, to a user equipment (UE), one or more Internet protocol (IP) packets associated with an application data unit (ADU) traffic flow; and transmitting, to the UE, ADU metadata associated with the one or more IP packets.

Aspect 19: The method of Aspect 18, wherein the ADU metadata includes at least one of: an indication that the one or more IP packets are associated with the ADU traffic flow, an indication of a quality of service (QoS) flow associated with the one or more IP packets, an indication of an ADU in which the one or more IP packets are included, an indication of a size of the ADU, an indication of a quantity of IP packets included in the ADU, or an indication of a respective IP packet number for each of the one or more IP packets.

Aspect 20: The method of Aspect 18 or 19, wherein the ADU metadata is included in an ADU metadata header associated with the one or more IP packets, wherein the ADU metadata header includes a plurality of fields that are configured to indicate the ADU metadata.

Aspect 21: The method of Aspect 20, wherein the plurality of fields include at least one of: a 1-bit field indicating that the one or more IP packets are associated with the ADU traffic flow, a first multiple-bit field indicating a quality of service (QoS) flow associated with the one or more IP packets, a second multiple-bit field indicating an ADU in which the one or more IP packets are included, a first configurable-sized field indicating a size of the ADU, a second configurable-sized field indicating a quantity of IP packets included in the ADU, or a third configurable-sized field indicating a respective IP packet number for each of the one or more IP packets.

Aspect 22: The method of Aspect 20 or 21, further comprising: transmitting, to the UE, a radio resource control (RRC) configuration that indicates a respective size of at least a subset of the plurality of fields.

Aspect 23: The method of one or more of Aspects 18-22, wherein transmitting the ADU metadata comprises: transmitting the ADU metadata in a service data access protocol (SDAP) protocol data unit (PDU) or in an extended subheader of a medium access control (MAC) service data unit (SDU).

Aspect 24: The method of Aspect 23, wherein the ADU metadata is included between an SDAP header of the SDAP PDU and data of the SDAP PDU, and wherein the data of the SDAP PDU includes the one or more IP packets.

Aspect 25: The method of one or more of Aspects 18-24, wherein transmitting the ADU metadata comprises: transmitting the ADU metadata in a packet data convergence protocol (PDCP) protocol data unit (PDU).

Aspect 26: The method of Aspect 25, wherein the ADU metadata is included in a ciphered part of the PDCP PDU between a header of the PDCP PDU and a PDCP service data unit (SDU) of the PDCP PDU, and wherein the PDCP SDU includes the one or more IP packets.

Aspect 27: The method of Aspect 26, further comprising: receiving the ADU metadata in an out-of-band communication from another network node, wherein the ADU metadata is included in a general packet radio service (GPRS) tunneling protocol user (GTP-U) header of the out-of-band communication.

Aspect 28: The method of one or more of Aspects 25-27, wherein the ADU metadata is included in a non-ciphered part of the PDCP PDU.

Aspect 29: The method of one or more of Aspects 25-28, wherein the ADU metadata is included in an extended PDCP header of the PDCP PDU.

Aspect 30: A method of wireless communication performed by a first network node, comprising: receiving, from a user equipment (UE): one or more Internet protocol (IP) packets associated with an application data unit (ADU) traffic flow, and ciphered ADU metadata associated with the one or more IP packets; transmitting the one or more IP packets and the ciphered ADU metadata to a second network node; and receiving, from the second network node, deciphered ADU metadata associated with the one or more IP packets.

Aspect 31: The method of Aspect 30, wherein receiving the deciphered ADU metadata comprises: receiving the deciphered ADU metadata on an F1 interface.

Aspect 32: A method of wireless communication performed by a first network node, comprising: receiving, from a second network node: one or more Internet protocol (IP) packets associated with an application data unit (ADU) traffic flow, and ciphered ADU metadata associated with the one or more IP packets; deciphering the ciphered ADU metadata to obtain deciphered ADU metadata associated with the one or more IP packets; and transmitting, to the second network node, the deciphered ADU metadata.

Aspect 33: The method of Aspect 32, wherein transmitting the deciphered ADU metadata comprises: transmitting the deciphered ADU metadata on an F1 interface.

Aspect 34: An apparatus for wireless communication at a device, comprising a processor; memory coupled with the processor; and instructions stored in the memory and executable by the processor to cause the apparatus to perform the method of one or more of Aspects 1-3.

Aspect 35: A device for wireless communication, comprising a memory and one or more processors coupled to the memory, the one or more processors configured to perform the method of one or more of Aspects 1-3.

Aspect 36: An apparatus for wireless communication, comprising at least one means for performing the method of one or more of Aspects 1-3.

Aspect 37: A non-transitory computer-readable medium storing code for wireless communication, the code comprising instructions executable by a processor to perform the method of one or more of Aspects 1-3.

Aspect 38: A non-transitory computer-readable medium storing a set of instructions for wireless communication, the set of instructions comprising one or more instructions that, when executed by one or more processors of a device, cause the device to perform the method of one or more of Aspects 1-3.

Aspect 39: An apparatus for wireless communication at a device, comprising a processor; memory coupled with the processor; and instructions stored in the memory and executable by the processor to cause the apparatus to perform the method of one or more of Aspects 4-17.

Aspect 40: A device for wireless communication, comprising a memory and one or more processors coupled to the memory, the one or more processors configured to perform the method of one or more of Aspects 4-17.

Aspect 41: An apparatus for wireless communication, comprising at least one means for performing the method of one or more of Aspects 4-17.

Aspect 42: A non-transitory computer-readable medium storing code for wireless communication, the code comprising instructions executable by a processor to perform the method of one or more of Aspects 4-17.

Aspect 43: A non-transitory computer-readable medium storing a set of instructions for wireless communication, the set of instructions comprising one or more instructions that, when executed by one or more processors of a device, cause the device to perform the method of one or more of Aspects 4-17.

Aspect 44: An apparatus for wireless communication at a device, comprising a processor; memory coupled with the processor; and instructions stored in the memory and executable by the processor to cause the apparatus to perform the method of one or more of Aspects 18-29.

Aspect 45: A device for wireless communication, comprising a memory and one or more processors coupled to the memory, the one or more processors configured to perform the method of one or more of Aspects 18-29.

Aspect 46: An apparatus for wireless communication, comprising at least one means for performing the method of one or more of Aspects 18-29.

Aspect 47: A non-transitory computer-readable medium storing code for wireless communication, the code comprising instructions executable by a processor to perform the method of one or more of Aspects 18-29.

Aspect 48: A non-transitory computer-readable medium storing a set of instructions for wireless communication, the set of instructions comprising one or more instructions that, when executed by one or more processors of a device, cause the device to perform the method of one or more of Aspects 18-29.

Aspect 49: An apparatus for wireless communication at a device, comprising a processor; memory coupled with the processor; and instructions stored in the memory and executable by the processor to cause the apparatus to perform the method of one or more of Aspects 30-31.

Aspect 50: A device for wireless communication, comprising a memory and one or more processors coupled to the memory, the one or more processors configured to perform the method of one or more of Aspects 30-31.

Aspect 51: An apparatus for wireless communication, comprising at least one means for performing the method of one or more of Aspects 30-31.

Aspect 52: A non-transitory computer-readable medium storing code for wireless communication, the code comprising instructions executable by a processor to perform the method of one or more of Aspects 30-31.

Aspect 53: A non-transitory computer-readable medium storing a set of instructions for wireless communication, the set of instructions comprising one or more instructions that, when executed by one or more processors of a device, cause the device to perform the method of one or more of Aspects 30-31.

Aspect 54: An apparatus for wireless communication at a device, comprising a processor; memory coupled with the processor; and instructions stored in the memory and executable by the processor to cause the apparatus to perform the method of one or more of Aspects 32-33.

Aspect 55: A device for wireless communication, comprising a memory and one or more processors coupled to the memory, the one or more processors configured to perform the method of one or more of Aspects 32-33.

Aspect 56: An apparatus for wireless communication, comprising at least one means for performing the method of one or more of Aspects 32-33.

Aspect 57: A non-transitory computer-readable medium storing code for wireless communication, the code comprising instructions executable by a processor to perform the method of one or more of Aspects 32-33.

Aspect 58: A non-transitory computer-readable medium storing a set of instructions for wireless communication, the set of instructions comprising one or more instructions that, when executed by one or more processors of a device, cause the device to perform the method of one or more of Aspects 32-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive, from a network node, in a radio resource control (RRC) communication, an indication of one or more data radio bearers between the UE and the network node that are configured for application data unit (ADU) traffic; and
communicate, with an application server, one or more ADU traffic flows through the network node using the one or more data radio bearers, wherein the ADU traffic flows comprise ADU metadata in an ADU metadata header, the ADU metadata header comprising a plurality of fields that are configured to indicate the ADU metadata.

2. The UE of claim 1, wherein the one or more processors, to communicate the one or more ADU traffic flows with the application server, are configured to:
receive, on a data radio bearer of the one or more data radio bearers, an ADU of an ADU traffic flow included in the one or more ADU traffic flows; and
at least one of:
determine that one or more Internet protocol (IP) packets, of a plurality of IP packets of the ADU, are missing,
determine an ADU content policy for the plurality of IP packets of the ADU,
transmit a packet data convergence protocol (PDCP) control protocol data unit (PDU) that identifies the one or more IP packets that are missing, or
transmit an indication that a quantity of received IP packets of the plurality of IP packets of the ADU satisfies a quantity threshold.

3. A user equipment (UE) for wireless communication, comprising:
a memory; and
one or more processors, coupled to the memory, configured to:
receive one or more Internet protocol (IP) packets associated with an application data unit (ADU) traffic flow;
receive, in a radio resource control (RRC) communication, an indication of a quantity of bits, in ADU metadata, corresponding to the one or more IP packets; and
receive the ADU metadata in an ADU metadata header, associated with the one or more IP packets, wherein the ADU metadata header comprises a plurality of fields that are configured to indicate the ADU metadata.

4. The UE of claim 3, wherein the ADU metadata includes at least one of:
an indication that the one or more IP packets are associated with the ADU traffic flow,
an indication of a quality of service (QOS) flow associated with the one or more IP packets,
an indication of an ADU in which the one or more IP packets are included,
an indication of a size of the ADU,
an indication of a quantity of IP packets included in the ADU, or
an indication of a respective IP packet number for each of the one or more IP packets.

5. The UE of claim 4, wherein the plurality of fields include at least one of:
a 1-bit field indicating that the one or more IP packets are associated with the ADU traffic flow,
a first multiple-bit field indicating a quality of service (QOS) flow associated with the one or more IP packets,
a second multiple-bit field indicating an ADU in which the one or more IP packets are included,
a first configurable-sized field indicating a size of the ADU,
a second configurable-sized field indicating a quantity of IP packets included in the ADU, or
a third configurable-sized field indicating a respective IP packet number for each of the one or more IP packets.

6. The UE of claim 2, wherein the
RRC communication indicates a size of at least a subset of the plurality of fields.

7. The UE of claim 3, wherein the one or more processors, to receive the ADU metadata, are configured to:
receive the ADU metadata in a service data access protocol (SDAP) protocol data unit (PDU).

8. The UE of claim 7, wherein the ADU metadata is included between an SDAP header of the SDAP PDU and data of the SDAP PDU, and
wherein the data of the SDAP PDU includes the one or more IP packets.

9. The UE of claim 3, wherein the one or more processors, to receive the ADU metadata, are configured to:
receive the ADU metadata in a packet data convergence protocol (PDCP) protocol data unit (PDU).

10. The UE of claim 9, wherein the ADU metadata is included in a ciphered part of the PDCP PDU between a header of the PDCP PDU and a PDCP service data unit (SDU) of the PDCP PDU, and
wherein the PDCP SDU includes the one or more IP packets.

11. The UE of claim 9, wherein the ADU metadata is included in at least one of:
a non-ciphered part of the PDCP PDU, or
an extended PDCP header of the PDCP PDU.

12. The UE of claim 9, wherein the one or more processors are further configured to:
determine that reception of a PDCP service data unit (SDU) of the PDCP PDU is not required for decoding an ADU associated with the PDCP PDU;
identify, based at least in part on the ADU metadata, at least one of one or more radio link control (RLC) PDUs or one or more RLC PDU segments included in the PDCP SDU; and
transmit an RLC status report, wherein the at least one of the one or more RLC PDUs or the one or more RLC PDU segments are omitted from the RLC status report.

13. The UE of claim 3, wherein the one or more processors, to receive the ADU metadata, are configured to:
receive the ADU metadata in an extended sub-header of a medium access control (MAC) service data unit (SDU).

14. The UE of claim 3, wherein the one or more processors are further configured to:
determine respective decoding outcomes for each of the one or more IP packets; and
provide feedback associated with the respective decoding outcomes.

15. The UE of claim 14, wherein the one or more processors, to provide the feedback associated with the respective decoding outcomes, are configured to:
provide the feedback associated with the respective decoding outcomes to facilitate forward error correction redundancy adaptation for the ADU traffic flow.

16. A network node for wireless communication, comprising:
a memory; and
one or more processors, coupled to the memory, configured to:
transmit, to a user equipment (UE), one or more Internet protocol (IP) packets associated with an application data unit (ADU) traffic flow;
transmit, in a radio resource control (RRC) communication, an indication of a quantity of bits, in ADU metadata, corresponding to the one or more IP packets; and
transmit, to the UE, the ADU metadata, in an ADU metadata header, associated with the one or more IP packets, wherein the ADU metadata header comprises a plurality of fields that are configured to indicate the ADU metadata.

17. The network node of claim 16, wherein the ADU metadata includes at least one of:
an indication that the one or more IP packets are associated with the ADU traffic flow,
an indication of a quality of service (QOS) flow associated with the one or more IP packets,
an indication of an ADU in which the one or more IP packets are included,
an indication of a size of the ADU,
an indication of a quantity of IP packets included in the ADU, or
an indication of a respective IP packet number for each of the one or more IP packets.

18. The network node of claim 16, wherein the plurality of fields include at least one of:
a 1-bit field indicating that the one or more IP packets are associated with the ADU traffic flow,
a first multiple-bit field indicating a quality of service (QOS) flow associated with the one or more IP packets,
a second multiple-bit field indicating an ADU in which the one or more IP packets are included,
a first configurable-sized field indicating a size of the ADU,
a second configurable-sized field indicating a quantity of IP packets included in the ADU, or
a third configurable-sized field indicating a respective IP packet number for each of the one or more IP packets.

19. The network node of claim 16, wherein the RRC communication indicates a respective size of at least a subset of the plurality of fields.

20. The network node of claim 16, wherein the one or more processors, to transmit the ADU metadata, are configured to:
transmit the ADU metadata in a service data access protocol (SDAP) protocol data unit (PDU).

21. The network node of claim 20, wherein the ADU metadata is included between an SDAP header of the SDAP PDU and data of the SDAP PDU, and
wherein the data of the SDAP PDU includes the one or more IP packets.

22. The network node of claim 16, wherein the one or more processors, to transmit the ADU metadata, are configured to:
transmit the ADU metadata in a packet data convergence protocol (PDCP) protocol data unit (PDU) or in an extended sub-header of a medium access control (MAC) service data unit (SDU).

23. The network node of claim 22, wherein the ADU metadata is included in a ciphered part of the PDCP PDU between a header of the PDCP PDU and a PDCP service data unit (SDU) of the PDCP PDU, and
wherein the PDCP SDU includes the one or more IP packets.

24. The network node of claim 23, wherein the one or more processors are further configured to:
receive the ADU metadata in an out-of-band communication from another network node,
wherein the ADU metadata is included in a general packet radio service (GPRS) tunneling protocol user (GTP-U) header of the out-of-band communication.

25. The network node of claim 22, wherein the ADU metadata is included in an extended PDCP header of the PDCP PDU.

26. A first network node for wireless communication, comprising:
a memory; and
one or more processors, coupled to the memory, configured to:
receive, from a user equipment (UE):
one or more Internet protocol (IP) packets associated with an application data unit (ADU) traffic flow, and
ciphered ADU metadata in an ADU metadata header comprising a plurality of fields that are configured to indicate the ciphered ADU metadata, the ciphered ADU metadata comprising a quantity of bits, associated with the one or more IP packets, wherein the quantity of bits is based at least in part on a radio resource control (RRC) configuration;
transmit the one or more IP packets and the ciphered ADU metadata to a second network node; and
receive, from the second network node, deciphered ADU metadata associated with the one or more IP packets.

27. The first network node of claim 26, wherein the one or more processors, to receive the deciphered ADU metadata, are configured to:
receive the deciphered ADU metadata on an F1 interface.

28. The network node of claim 1, wherein the ADU metadata comprises an ADU service flow flag.

29. The network node of claim 28, wherein the ADU service flow flag is in a 1-bit field in the ADU metadata header.

30. The network node of claim 22, wherein the ADU metadata is included in a non-ciphered part of the PDCP PDU.

* * * * *